United States Patent
Tsuchida

(10) Patent No.: US 12,450,447 B2
(45) Date of Patent: Oct. 21, 2025

(54) WIRELESS TAG COMMUNICATION APPARATUS, WIRELESS TAG COMMUNICATION SYSTEM, AND COMMUNICATION METHOD FOR A WIRELESS TAG COMMUNICATION APPARATUS

(71) Applicant: Toshiba Tec Kabushiki Kaisha, Tokyo (JP)

(72) Inventor: Sunao Tsuchida, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/799,517

(22) Filed: Aug. 9, 2024

(65) Prior Publication Data

US 2025/0181851 A1   Jun. 5, 2025

(51) Int. Cl.
*G06K 7/10* (2006.01)
(52) U.S. Cl.
CPC ............... *G06K 7/10128* (2013.01)
(58) Field of Classification Search
None
See application file for complete search history.

(56) References Cited

U.S. PATENT DOCUMENTS

| | | | |
|---|---|---|---|
| 2014/0203918 A1* | 7/2014 | Hori | G06K 7/10079 340/10.51 |
| 2016/0180123 A1* | 6/2016 | Forster | G06K 7/10019 340/10.51 |

FOREIGN PATENT DOCUMENTS

JP        2010-021901 A       1/2010

* cited by examiner

*Primary Examiner* — Thien M Le
*Assistant Examiner* — April A Taylor
(74) *Attorney, Agent, or Firm* — Kim & Stewart LLP

(57) ABSTRACT

In accordance with an embodiment, a wireless tag communication apparatus causes a reading command specifying a first state as a flag state to be sent, to thereby acquire identification information of a wireless tag in the first state. In a case where the wireless tag communication apparatus determines the wireless tag that is a detection target whose location has not been detected as the wireless tag that is a reading target on the basis of the identification information, the wireless tag communication apparatus causes the flag state of the determined wireless tag to be rewritten from the first state to the second state. The wireless tag communication apparatus causes identification information reading command specifying a second state as the flag state to be sent, to thereby acquire the identification information only from the wireless tag that is the reading target in the second state.

12 Claims, 17 Drawing Sheets

| Identification information | Detection completion information | |
|---|---|---|
| ID 1 | × | ~ 21 |
| ID 2 | × | |
| ID 3 | ○ | |
| ID 4 | × | |
| ⋮ | ⋮ | |

Fig.6

| Identification information | Acquisition time | RSSI | Phase | Apparatus location |
|---|---|---|---|---|
| ID 1 | t1 | RSSI1 | Phase1 | P1 |
| ID 2 | t2 | RSSI2 | Phase2 | P1 |
| ID 3 | t3 | RSSI3 | Phase3 | P1 |
| ID 3 | t4 | RSSI4 | Phase4 | P2 |
| ID 1 | t5 | RSSI5 | Phase5 | P2 |
| ID 2 | t6 | RSSI6 | Phase6 | P2 |
| ID 1 | t7 | RSSI7 | Phase7 | P3 |
| ID 3 | t8 | RSSI8 | Phase8 | P3 |
| ID 2 | t9 | RSSI9 | Phase9 | P3 |
| ID 2 | t10 | RSSI10 | Phase10 | P4 |
| ID 4 | t11 | RSSI11 | Phase11 | P4 |
| ID 1 | t12 | RSSI12 | Phase12 | P4 |
| ID 3 | t13 | RSSI13 | Phase13 | P4 |
| ⋮ | ⋮ | ⋮ | ⋮ | ⋮ |

Fig.7

WIRELESS TAG COMMUNICATION APPARATUS, WIRELESS TAG COMMUNICATION SYSTEM, AND COMMUNICATION METHOD FOR A WIRELESS TAG COMMUNICATION APPARATUS

CROSS-REFERENCE TO RELATED APPLICATIONS

This application is based upon and claims the benefit of priority from the prior Japanese Patent Application No. 2023-203868, filed on Dec. 1, 2023, the entire contents of which are incorporated herein by reference.

FIELD

An embodiment described here generally relates to a wireless tag communication apparatus, a wireless tag communication system, and a communication method for a wireless tag communication apparatus.

BACKGROUND

In recent years, a technology of attaching a wireless tag with unique identification information recorded, which is called radio frequency identification (RFID) tag, to a management target item and reading the identification information from the wireless tag via a wireless tag communication apparatus that wirelessly communicates with the wireless tag, which is called an RFID reader, for detecting the item has been used in various applications.

In this technology, only sending a reading command from the wireless tag communication apparatus once enables identification information to be read from all wireless tags located in a communication area of the wireless tag communication apparatus. However, in fact, reading misses occur due to various factors such as relative movement between the wireless tag and the wireless tag communication apparatus and reflection of radio waves, and therefore the wireless tag communication apparatus needs to send the reading command multiple times. Therefore, in accordance with the reading command at each time, the identification information on which reading has already been completed is also read, which reduces the opportunity to read the identification information that has not been read yet. Therefore, the time to complete reading of identification information of all wireless tags increases and the reading rate per unit time decreases. Instructing not to reset flag information of a wireless tag whose identification information has been acquired once in accordance with a reading command for preventing this is known.

By the way, one of applications of the wireless tag and the wireless tag communication apparatus is to inventory a large number of items stored on shelves in warehouses or backyards of stores and to search for desired items. In this application, not only item detection, but also location detection as to where the item is located are necessary. To detect the location, it is essential to read a single wireless tag multiple times. It should be noted that reading a wireless tag whose location has already been detected reduces the opportunity to read wireless tags whose locations have not been detected yet. Therefore, in a case where there is a plurality of wireless tags as location detection targets, i.e., reading targets, it takes long time to read all these wireless tags.

BRIEF DESCRIPTION OF THE DRAWINGS

FIG. 6 is a schematic view showing a main data structure which is stored in a detection target storage unit provided in a wireless tag communication apparatus according to the first embodiment.

FIG. 7 is a schematic view showing a main data structure which is stored in a read data storage unit provided in the wireless tag communication apparatus.

DETAILED DESCRIPTION

Figure 1:
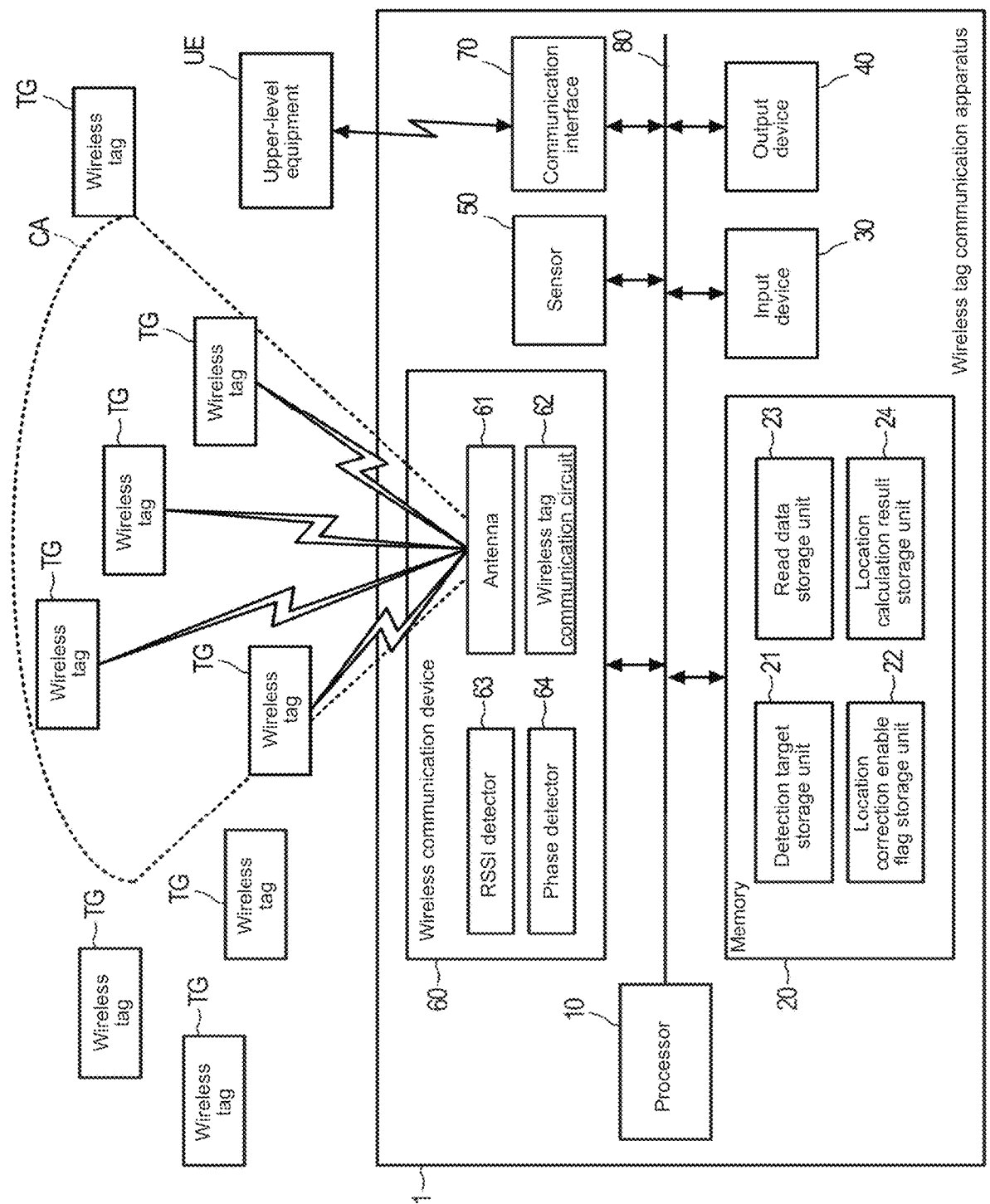
FIG. 1 is a schematic configuration diagram showing a wireless tag communication system according to a first embodiment.

In accordance with one embodiment, a wireless tag communication apparatus includes a wireless tag communication apparatus and a processor. The wireless communication device sends a reading command for reading identification information of a wireless tag to the wireless tag and receives the identification information from the wireless tag. The reading command specifies a flag state, which is either one of a first state and a second state, which is stored in a flag of the wireless tag. The wireless tag transmits the identification information only in a case where the flag state corresponds to the specified flag state when the wireless tag receives the reading command specifying the flag state. The processor sends the reading command specifying the first state as the flag state via the wireless communication device to thereby acquire the identification information transmitted from the wireless tag whose flag state is the first state and, in a case where the processor determines a wireless tag that is a detection target whose location has not been detected as a wireless tag that is a reading target on the basis of the acquired identification information, performs first processing of causing the flag state of the determined wireless tag to be rewritten from the first state to the second state. In addition, the processor sends the reading command specifying the second state as the flag state via the wireless communication device to thereby perform second processing of acquiring the identification information only from the wireless tag that is the reading target in the second state.

Hereinafter, embodiments will be described with reference to the drawings. In the drawings, the same reference signs denote the same or similar portions.

First Embodiment

FIG. 1 is a schematic configuration diagram showing a wireless tag communication system according to a first embodiment. The wireless tag communication system according to the first embodiment includes a wireless tag communication apparatus 1 according to the first embodiment and upper-level equipment UE. The wireless tag communication apparatus 1 detects a location of a location detection target wireless tag TG from a plurality of wireless tags TG. The upper-level equipment UE is an information processing apparatus that uses a location of a wireless tag TG that is a detection target detected by the wireless tag communication apparatus 1.

Before describing each apparatus, first of all, a reading operation of the wireless tags TG and a location detection method for the wireless tag will be described for the sake of easy understanding of the present embodiment.

Figure 2:
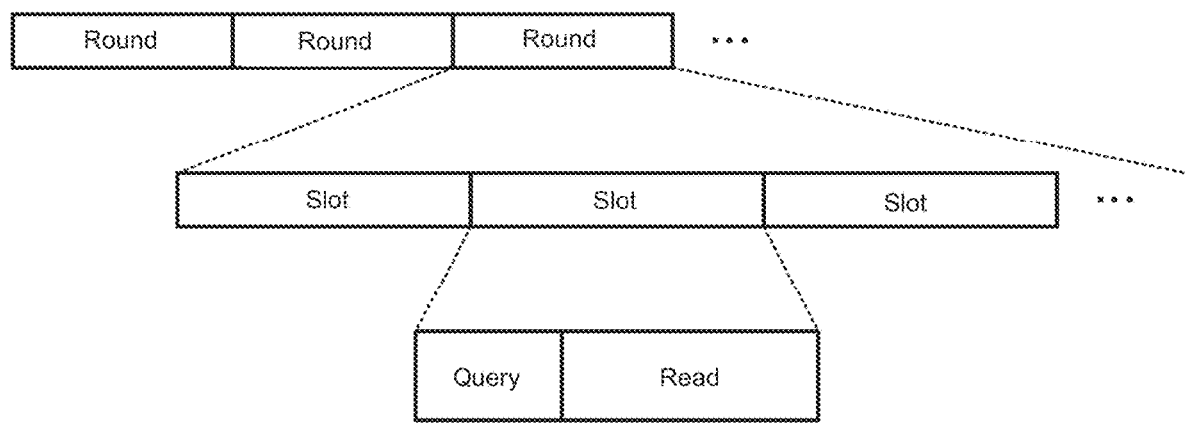
FIG. 2 is a schematic view showing an overview of a reading operation of wireless tags.

Although there are various types of RFID systems, the Class-1 Generation-2 system (commonly called Gen2) developed by EPCglobal is currently the mainstream. FIG. 2 is a schematic view showing an overview of the reading operation of the wireless tags TG in this Gen2 system. The reading of the wireless tag TG is typically performed multiple times in many cases. In each process of reading, processing called round is repeated following initialization of the wireless tag communication apparatus 1, which is an RFID reader, and the wireless tags TG. In the round, processing called slot is repeated following initialization of the round. Each slot is divided into query and reading of the wireless tag TG. The number of slots in the round is determined in accordance with a Q value set by the wireless tag communication apparatus 1 at the time of initialization of the round. Specifically, the number of slots is 2Q. The wireless tag TG randomly determines which slot to respond. In a case where there is a plurality of wireless tags TG in the communication area of the wireless tag communication apparatus 1, the randomly determined slot to respond can be the same between two or more wireless tags TG. In such a case, the reading is impossible. In this case, those wireless tags TG are read in the next round.

The reading of the wireless tag TG in each slot will be described in detail. In the Gen2 system, the wireless tag TG has two flag states (A value and B value) rewritable by the wireless tag communication apparatus 1, which is called inventoried flag. This flag state can be, for example, a state indicating that the A value has not been read and a state indicating that the B value has been read. When the wireless tag communication apparatus 1 reads the wireless tag TG, the wireless tag communication apparatus 1 specifies the flag state of this flag and the wireless tag TG does not respond in a case where the wireless tag TG has a flag state different from this specified flag state. For example, in the reading where the A value is specified as the flag state, a wireless tag TG whose flag state is the A value responds while a wireless tag TG whose flag state is the B value does not respond. The flag state of the wireless tag TG that has responded is rewritten from the A value to the B value by the wireless tag communication apparatus 1. Therefore, the wireless tag TG that has responded does not respond to reading where the A value is specified as the flag state in the subsequent round. The flag state of the wireless tag TG whose flag state has been rewritten to the B value returns from the B value to the A value when a certain period of time elapses after the wireless tag TG stops receiving radio waves.

Figure 3:
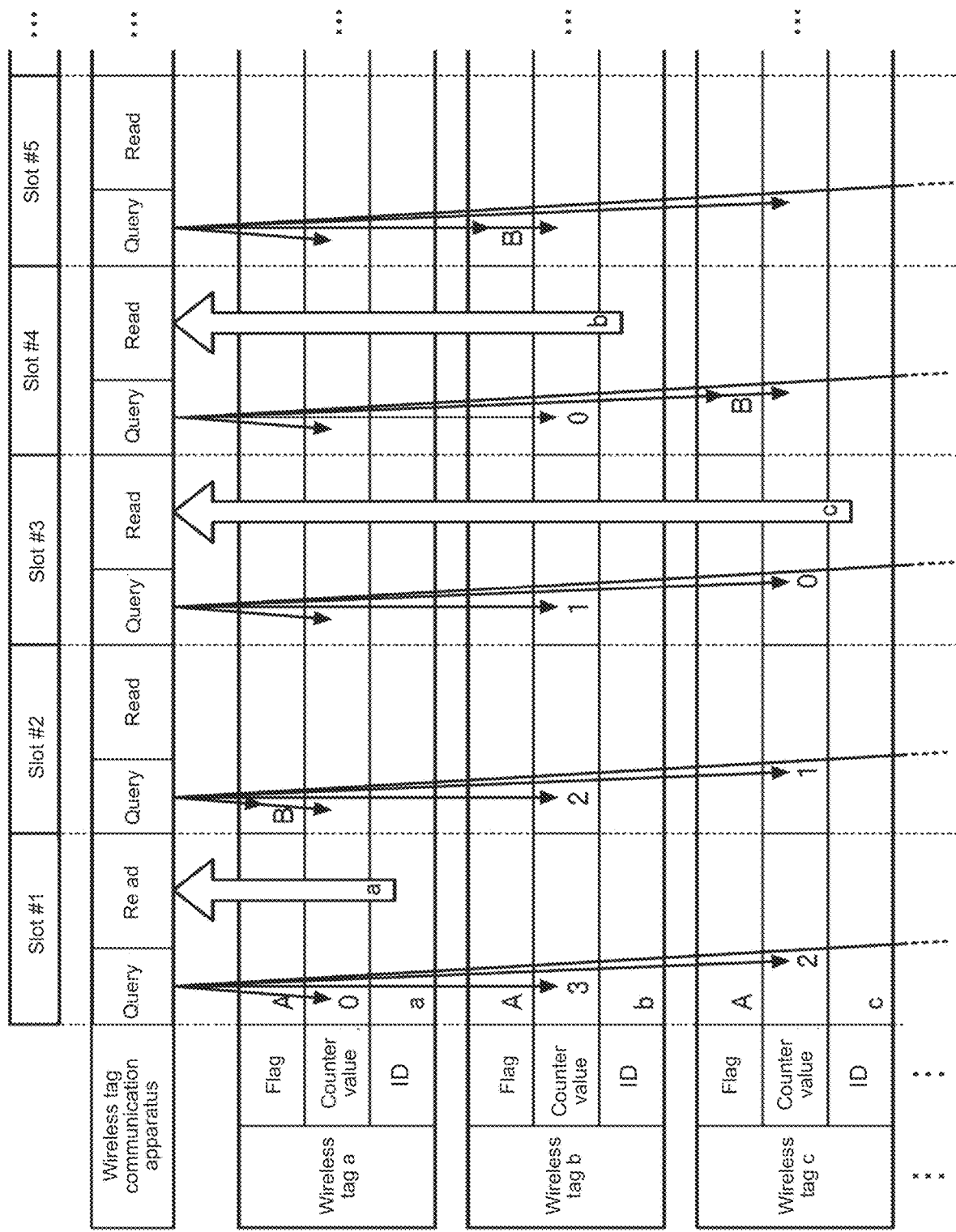
FIG. 3 is a schematic view showing an overview of operations in slots in the reading operation of the wireless tags.

FIG. 3 is a schematic view showing an overview of operations in slots in the reading operation of the wireless tags TG. Regarding each wireless tag TG, a value randomly determined on the basis of the Q value at the time of initialization of the round is set as a counter value of an internal counter. For example, assuming Q=3, the number of slots is 2×3=6 and the counter value is any one of seven values of from 0 to 6. In the example in FIG. 3, the counter value is "0" for the wireless tag TG with identification information of "a," i.e., with a tag ID=a, the counter value is "3" for the wireless tag TG with a tag ID=b, the counter value is "2" for the wireless tag TG with a tag ID=c, and so on. In FIG. 3, three wireless tags TG of the wireless tags TG, which have entered the communication area of the wireless tag communication apparatus 1, are shown. There is a case where only a smaller number of wireless tags TG can be located in the communication area and there is also a case where no wireless tags TG are located in the communication area. In addition, there is also a case where wireless tags TG with the same counter value are located in the communication area.

Each wireless tag TG whose flag state has been set to be the A value indicating that the wireless tag TG has not been read at the time of initialization of the reading transmits the identification information of the wireless tag TG to the wireless tag communication apparatus 1 in response to a query according to the reading command specifying the A value as the flag state from the wireless tag communication apparatus 1 in a case where the counter value is "0." More specifically, the wireless tag TG whose counter value is "0" transmits a 16-bit random number or pseudo-random number as a response signal to the wireless tag communication apparatus 1. The wireless tag communication apparatus 1 receives some response signal and transmits acknowledgement (ACK) with the (pseudo-) random number of the received response signal. In a case where the wireless tag TG receives the ACK with the (pseudo-) random number transmitted as the response signal, the wireless tag TG transmits the identification information to the wireless tag communication apparatus 1. The wireless tag communication apparatus 1 reads the identification information. It should be noted that the wireless tag TG transmitting means reflecting necessary information on a carrier wave of a signal transmitted from the wireless tag communication apparatus 1, for example, backscattering.

In the example in FIG. 3, in Slot #1 that is the first slot in the round, with respect to a query from the wireless tag communication apparatus 1, one of three wireless tags TG with the tag IDs of "a," "b," and "c," whose counter value is "0", is the wireless tag TG with the tag ID=a. Therefore, the wireless tag TG with the tag ID=a transmits "a" that is the identification information to the wireless tag communication apparatus 1. The wireless tags TG with the tag ID=b and the tag ID=c transmit no response to the query because their counter values are not "0."

In Slot #2 that is the next slot, in response to a query from the wireless tag communication apparatus 1, the wireless tag TG with the tag ID=a whose counter value is "0" rewrites the flag state from the A value to the B value indicating that the wireless tag has been read. That is, the query from the wireless tag communication apparatus 1 includes a flag rewriting instruction specifying the wireless tag TG that has been read. Once the flag state is rewritten to the B value, the wireless tag TG with the tag ID=a neither updates the counter value of "0" nor send the identification information. That is, the wireless tag TG with the tag ID=a stops responding to the query from the wireless tag communication apparatus 1. Moreover, the wireless tags TG with the tag ID=b and the tag ID=c whose counter values are other than "0," makes the counter values "−1" in response to the query. In this case, the counter values of the wireless tags TG with the tag ID=b and the tag ID=c respectively become "2" and "1," not "0." Therefore, the wireless tags TG with the tag ID=b and the tag ID=c transmit no response to the query.

In Slot #3 that is the next slot, in response to a query from the wireless tag communication apparatus 1, the wireless tag TG with the tag ID=a whose flag state has been set to be the B value does nothing. In contrast, the wireless tags TG with the tag ID=b and the tag ID=c whose counter values are other than "0" make the counter values "−1." In this case, the counter values of the wireless tags TG with the tag ID=b and the tag ID=c respectively become "1" and "0." Therefore, the wireless tag TG with the tag ID=c whose counter value is "0" transmits "c" that is the identification information to the wireless tag communication apparatus 1. Since the wireless tag TG with the tag ID=b transmits no response to the query because its counter value is not "0".

In Slot #4 that is the next slot, in response to a query from the wireless tag communication apparatus 1, the wireless tag TG with the tag ID=c whose counter value is "0" rewrites the flag state from the A value to the B value indicating that the wireless tag has been read. Moreover, the wireless tag TG with the tag ID=b whose counter value is other than "0" makes the counter value "−1." Accordingly, the counter value of the wireless tag TG with the tag ID=b becomes "0" and the wireless tag TG with the tag ID=b transmits "b" that is the identification information to the wireless tag communication apparatus 1.

In Slot #5 that is the next slot, in response to a query from the wireless tag communication apparatus 1, the wireless tag TG with the tag ID=b whose counter value is "0" rewrites the flag state from the A value to the B value indicating that the wireless tag has been read.

Provided that the counter value of the wireless tag TG with the tag ID=n not shown in FIG. 3 is the same as the counter value of another wireless tag TG, e.g., the wireless tag TG with the tag ID=c, the counter values of both become "0". In this case, the respective wireless tags TG transmit response signals with different (pseudo-) random numbers. When the wireless tag communication apparatus 1 receives a plurality of response signals as such, the wireless tag communication apparatus 1 transmits no ACK. Therefore, the wireless tags TG with the tag ID=c and the tag ID=n transmit no identification information. Then, in accordance with a query in the next slot, the counter values of these wireless tags TG are made "−1," such that the counter values change from "0" into the maximum counter values. Therefore, these wireless tags TG send no identification information because their counter values are not "0." The plurality of wireless tags TG whose counter values are the same has different counter values with high possibility when the counter values are randomly determined at the beginning of the next round, such that the plurality of wireless tags TG can be each read in any one of the slots.

Figure 4:
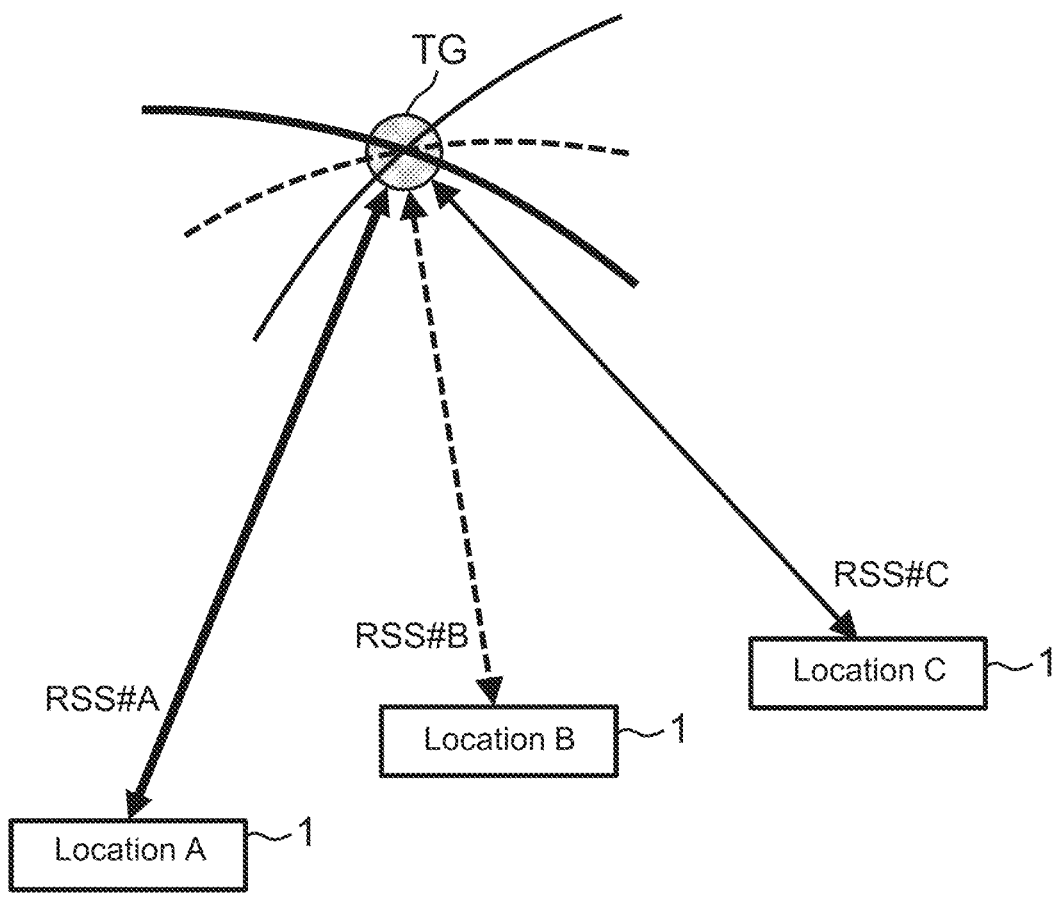
FIG. 4 is a schematic view for describing a location detection method by three-point measurement.

FIG. 4 is a schematic view for describing a location detection method by three-point measurement. When the wireless tag communication apparatus 1 reads the wireless tag TG, the wireless tag communication apparatus 1 stores apparatus information (antenna location and orientation) at that time and received signal strength indicators (RSSI) which are strength indicators of response signals from the wireless tag TG, which are detected by the wireless tag communication apparatus 1. Then, the wireless tag communication apparatus 1 calculates a location of the wireless tag TG by three-point measurement on the basis of stored results at three or more points, for example, location information A, B, and C and received signal strength indicators RSSI #A, RSSI #B, and RSSI #C.

Figure 5:
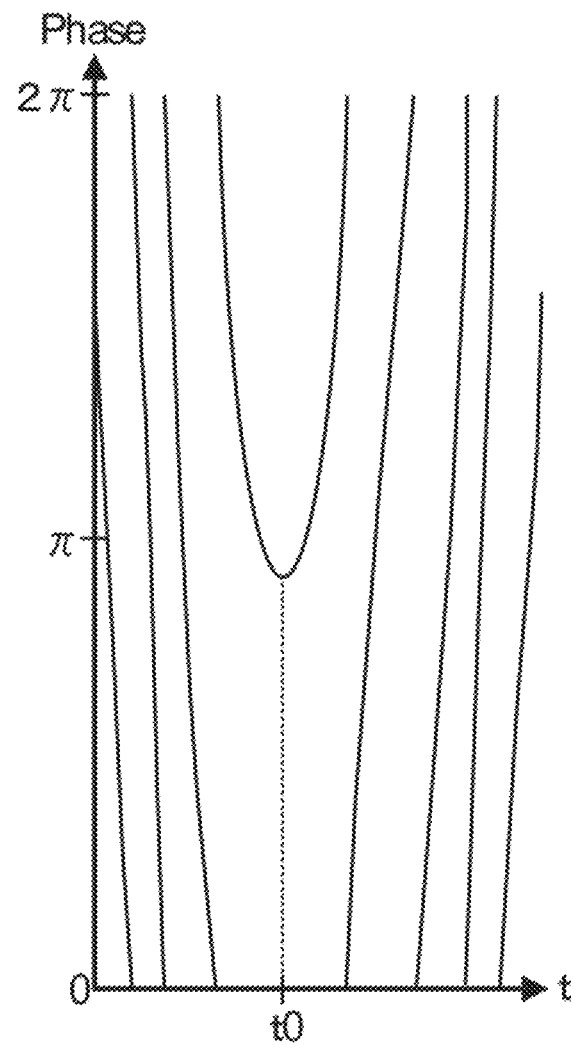
FIG. 5 is a schematic view for describing a location detection method based on a phase change.

FIG. 5 is a schematic view for describing a location detection method based on a phase change. The location detection method is a method disclosed in Japanese Patent Application Laid-open No. 2017-75927. When the wireless tag communication apparatus 1 reads the wireless tag TG, the wireless tag communication apparatus 1 detects a phase of a response signal in each apparatus location (antenna location and orientation) and stores the location and phase. Then, the wireless tag communication apparatus 1 sets a location when the slope of the stored phase change is reversed (time t0) as a location (first location) where the distance to the wireless tag TG is the shortest and calculates a location of the wireless tag TG on the basis of phases and distance detection parameters in the first location and a second location different from the first location.

In any location detection method, a plurality of apparatus locations may be achieved by scanning the orientation of the wireless tag communication apparatus 1 while staying at a single point. Alternatively, a plurality of apparatus locations may be achieved by performing reading with the wireless tag communication apparatus 1 directed to a single direction at a single point and performing reading with the wireless tag communication apparatus 1 after moving the wireless tag communication apparatus 1 to another point. In the latter case, it is also possible to continuously perform reading while moving the wireless tag communication apparatus 1.

In either case, it is necessary to perform a reading operation on each wireless tag TG multiple times in order to detect the location of the wireless tag TG. Therefore, if reading is configured not to be, in the subsequent round, performed on the wireless tag TG that has been read once as described above with reference to FIG. 3, acquisition of a plurality of RSSIs or phases necessary for location detection performed in accordance with reading is also not performed. As a result, the location detection cannot be performed. In view of this, when detecting the location of the wireless tag TG, the wireless tag communication apparatus 1 leaves the flag state in the A value without rewriting the flag state to the B value even with respect to the wireless tag TG that has been read, such that the wireless tag TG can be read in the next round again.

However, with this configuration, the wireless tag TG whose location has already been detected is continuously read unnecessarily, and therefore the reading operation of the wireless tags TG whose location has been detected reduces the opportunity to read the wireless tag TG whose location has not been detected yet.

Furthermore, in an environment where a location detection target wireless tag TG and other non-location detection target wireless tags TG are mixed, reading the non-location detection target wireless tags TG also reduces the opportunity to read the location detection target wireless tag TG whose location has not been detected yet. It is a big problem in particular in a use situation where an item to which a particular wireless tag TG has been attached should be searched for from a plurality of wireless tags TG.

The wireless tag communication system and the wireless tag communication apparatus 1 according to the present embodiment cope with such a problem.

The description of FIG. 1 will be continued. The wireless tag communication apparatus 1 includes a processor 10, a memory 20, an input device 30, an output device 40, a sensor 50, a wireless communication device 60, a communication interface 70, and a system communication channel 80. It should be noted that in FIG. 1, the "interface" is abbreviated as "I/F." The system communication channel 80 includes an address bus, a data bus, a control signal line, and the like. The system communication channel 80 connects the processor 10 and the other respective units directly or via a signal input/output circuit and transmits data signals exchanged between them. By connecting the processor 10 and the memory 20 to each other via the system communication channel 80, a computer of the wireless tag communication apparatus 1 is configured. The memory 20 includes a detection target storage unit 21, a location correction enable flag storage unit 22, a read data storage unit 23, and a location calculation result storage unit 24. The wireless communication device 60 includes an antenna 61, a wireless tag communication circuit 62, an RSSI detector 63, and a phase detector 64.

The processor 10 corresponds to a central part of the above-mentioned computer. The processor 10 controls the respective units to realize various functions as the wireless tag communication apparatus 1 in accordance with an operating system or a control program. The processor 10 is, for example, a central processing unit (CPU). The processor 10 may be, for example, a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA). Alternatively, the processor 10 may be a combination of some of them.

The memory 20 corresponds to a main storage part of the above-mentioned computer. The memory 20 includes a nonvolatile memory area and a volatile memory area. The memory 20 stores the operating system or the application program in the nonvolatile memory area. Moreover, the memory 20 stores data necessary for the processor 10 to execute processing for controlling the respective units in the nonvolatile or volatile memory area. The memory 20 includes the detection target storage unit 21 and the location correction enable flag storage unit 22 as that memory area, for example. In addition, the memory 20 uses the volatile memory area as a work area in which the processor 10 rewrites data as appropriate. The memory 20 includes the read data storage unit 23 and the location calculation result storage unit 24 as that memory area, for example. It should be noted that the nonvolatile memory area is, for example, a rewritable storage device such as a read only memory (ROM) or an electric erasable programmable read-only memory (EEPROM). Moreover, the volatile memory area is, for example, a random access memory (RAM).

The detection target storage unit 21 stores data regarding which wireless tag TG the location detection target is, whether or not the location of such a wireless tag TG has been detected, and the like. FIG. 6 is a schematic view showing a main data structure which is stored in the detection target storage unit 21. It should be noted that the data structure shown in FIG. 6 is an example. As long as information necessary for the processor 10 can be obtained, the format is not particularly limited. As shown in FIG. 6, the detection target storage unit 21 stores, for example, the identification information of the location detection target wireless tag TG which has been set from the upper-level equipment UE. Then, in addition, the detection target storage unit 21 stores detection completion information indicating whether or not the wireless tag TG has been detected in association with the identification information of the location detection target wireless tag TG. An x-mark of the detection completion information represents that the wireless tag TG has not been detected and a circle mark of the detection completion information represents that the wireless tag TG has been detected. The detection target storage unit 21 is capable of storing the detection completion information as a 1-bit flag of "0" for the x-mark or "1" for the circle mark, for example. Therefore, the detection target storage unit 21 is an example of a detection target storage unit that stores detection completion information indicating whether or not the wireless tag is a wireless tag whose location has been detected in association with the identification information of each of the one or more wireless tags that are the detection targets.

The location correction enable flag storage unit 22 stores a location correction enable flag indicating whether or not it is necessary to correct the detected location of the wireless tag TG. The location correction enable flag storage unit 22 is capable of storing the location correction enable flag as a 1-bit flag of "0" for a case where the correction is unnecessary or "1" for a case where the correction is necessary, for example. In this manner, the location correction enable flag storage unit 22 is an example of a setting storage unit that stores a location correction enable flag indicating a setting as to whether or not to correct the location of the wireless tag TG whose location has been detected.

The read data storage unit 23 stores data read from the location detection target wireless tag TG. FIG. 7 is a schematic view showing a main data structure which is stored in the read data storage unit 23. It should be noted that the data structure shown in FIG. 7 is an example. As long as information necessary for the processor 10 can be obtained, the format is not particularly limited. As shown in FIG. 7, the read data storage unit 23 stores data for location detection in association with the identification information read from the location detection target wireless tag TG. The data for location detection includes, for example, a time of acquisition, an RSSI, a phase, and an apparatus location.

The time of acquisition is a time when the identification information is acquired from the location detection target wireless tag TG. As described above, the identification information is read in different slots. Therefore, it can also be said that the time of acquisition is a time of slot generation. More particularly, it can be said that the time of acquisition is a time of reading the identification information in the slot. Although not shown in FIG. 1, the wireless tag communication apparatus 1 includes a clock and the processor 10 is capable of the time of acquisition of the identification information via the clock and causing the read data storage unit 23 to store the identification information acquired by the wireless communication device 60 and the time of acquisition. Moreover, the time of acquisition may be a current time or may be an elapsed time after the reading is started.

The RSSI is a signal strength of a response signal with identification information from the location detection target wireless tag TG. The RSSI is detected by the RSSI detector 63 of the wireless communication device 60. Moreover, the phase is a phase of the same response signal and is detected by the phase detector 64 of the wireless communication device 60. These RSSI and phase are an example of a communication state with the wireless tag TG, which is acquired by the wireless communication device 60. The processor 10 is capable of causing the read data storage unit 23 to store the RSSI and phase when the identification information is acquired, in association with the identification information. It should be noted that although a case of detecting the location by the use of both the RSSI and phase is shown as an example in FIGS. 1 and 7, a configuration to detect and store at least one of the RSSI or the phase may be employed because the location can be detected by the use of only either one of them.

The apparatus location is location information representing a location of the wireless tag communication apparatus 1 when acquiring a response signal from the location detection target wireless tag TG. The location information can include information about the location and orientation of the antenna 61 of the wireless communication device 60. The processor 10 calculates location and orientation of the antenna 61 on the basis of a detection result of the sensor 50. Although a location and attitude relationship between the antenna 61 and the wireless tag TG actually varies depending on performance such as directivity and the like of the antenna 61, the processor 10 calculates location and orientation, provided here that the wireless tag TG is located in a front direction of the antenna 61. The processor 10 causes the read data storage unit 23 to store the calculated apparatus location in association with the identification information. It should be noted that it takes a certain period of time for the processor 10 to calculate location and orientation of the antenna 61 on the basis of a detection result of the sensor 50. Therefore, although the time of acquisition is on a slot-by-slot basis, this apparatus location is on a round-by-round basis. That is, regarding one or more pieces of identification information acquired in a plurality of slots in one round, the same apparatus location is provided.

The location calculation result storage unit 24 stores a location detection result detected with respect to the location detection target wireless tag TG.

The input device 30 is an operation switch, an operation button, or the like, which is arranged in a casing (not shown) of the wireless tag communication apparatus 1. Alternatively, the input device 30 may be an interface for connecting to an operation switch, an operation button, or the like, which is separate from the casing of the wireless tag communication apparatus 1. The output device 40 is, for example, a display device such as a liquid-crystal display or an LED or an acoustic device such as a buzzer or a loudspeaker, which is arranged in the casing of the wireless tag communication apparatus 1. Alternatively, the output device 40 may be an interface for connecting to a display device or an acoustic device which is separate from the casing of the wireless tag communication apparatus 1. Moreover, the input device 30 and the output device 40 may be configured as a touch panel with touch keys arranged on a display screen of a liquid-crystal display or the like.

The processor 10 is capable of causing the user to set the location detection target wireless tag TG or to set the location correction enable flag by the use of the input device 30 and the output device 40. Moreover, the processor 10 is capable of informing the user of the detected location of the wireless tag TG that is the location detection target or of end of the location detection operation by the use of the output device 40.

The sensor 50 is various sensors used for calculating the apparatus location stored in the read data storage unit 23 described above. The sensor 50 can include an acceleration sensor and a camera, for example. For example, the processor 10 is capable of calculating an amount of movement of the wireless tag communication apparatus 1 on the basis of acceleration detected by the acceleration sensor and determining a location on the basis of the amount of movement. For example, the processor 10 is capable of estimating a self-location on the basis of an amount of movement of an object included in an image captured by the camera. Moreover, the sensor 50 may include a location measurement sensor such as a global locationing system (GPS) sensor.

The wireless communication device 60 has a communication area CA with a certain range as shown by the broken line in FIG. 1 and wirelessly communicates with a wireless tag TG, which has entered the communication area CA, for example, a UHF-band RFID tag. The wireless communication device 60 is an example of a wireless communication apparatus that communicates with the wireless tag TG, which has a flag to store either one flag state, the first state, e.g., the A value or the second state, e.g., the B value, and transmits the identification information only in a case where the flag state corresponds to a specified flag state when the wireless tag TG receives an identification information reading command specifying the flag state. The wireless tags TG include a location detection target wireless tag TG and non-detection target wireless tags TG that are not the location detection target. The wireless communication device 60 includes the antenna 61 and the wireless tag communication circuit 62 for wirelessly communicating with the wireless tag TG that has entered the communication area CA. In addition, the wireless communication device 60 includes the RSSI detector 63 that detects an RSSI that is a strength indicator of a response signal from the wireless tag TG and the phase detector 64 that detects a phase of the response signal from the wireless tag TG.

The communication interface 70 performs data communication with the connected upper-level equipment UE in accordance with a pre-set communication protocol. The connection to the upper-level equipment UE may be wired connection or may be wireless connection.

The upper-level equipment UE is an information processing apparatus such as an information processing device such as a server computer or a smartphone. The upper-level equipment UE can realize various functions such as a function of receiving and storing a detected location of the detection target wireless tag TG from the wireless tag communication apparatus 1, a function of using and presenting the stored location, a function of providing the stored location to another apparatus, and a function of generating new information combining the stored location. Moreover, the upper-level equipment UE may have a control function of the wireless tag communication apparatus 1 such as a function of providing the processor 10 with various settings such as a setting of the location detection target wireless tag TG in the wireless tag communication apparatus 1 and a setting of the location correction enable flag and a function of instructing to start the operation of the wireless tag communication apparatus 1.

Hereinafter, operations of the wireless tag communication system and the wireless tag communication apparatus 1 according to the present embodiment with the above-mentioned configurations will be described. It should be noted that descriptions of setting operations of the location detection target wireless tag TG and the location correction enable flag will be omitted because it is sufficient to set them in accordance with the user's specification. Therefore, an operation associated with the location detection of the detection target wireless tag TG will be described here.

Figure 8:
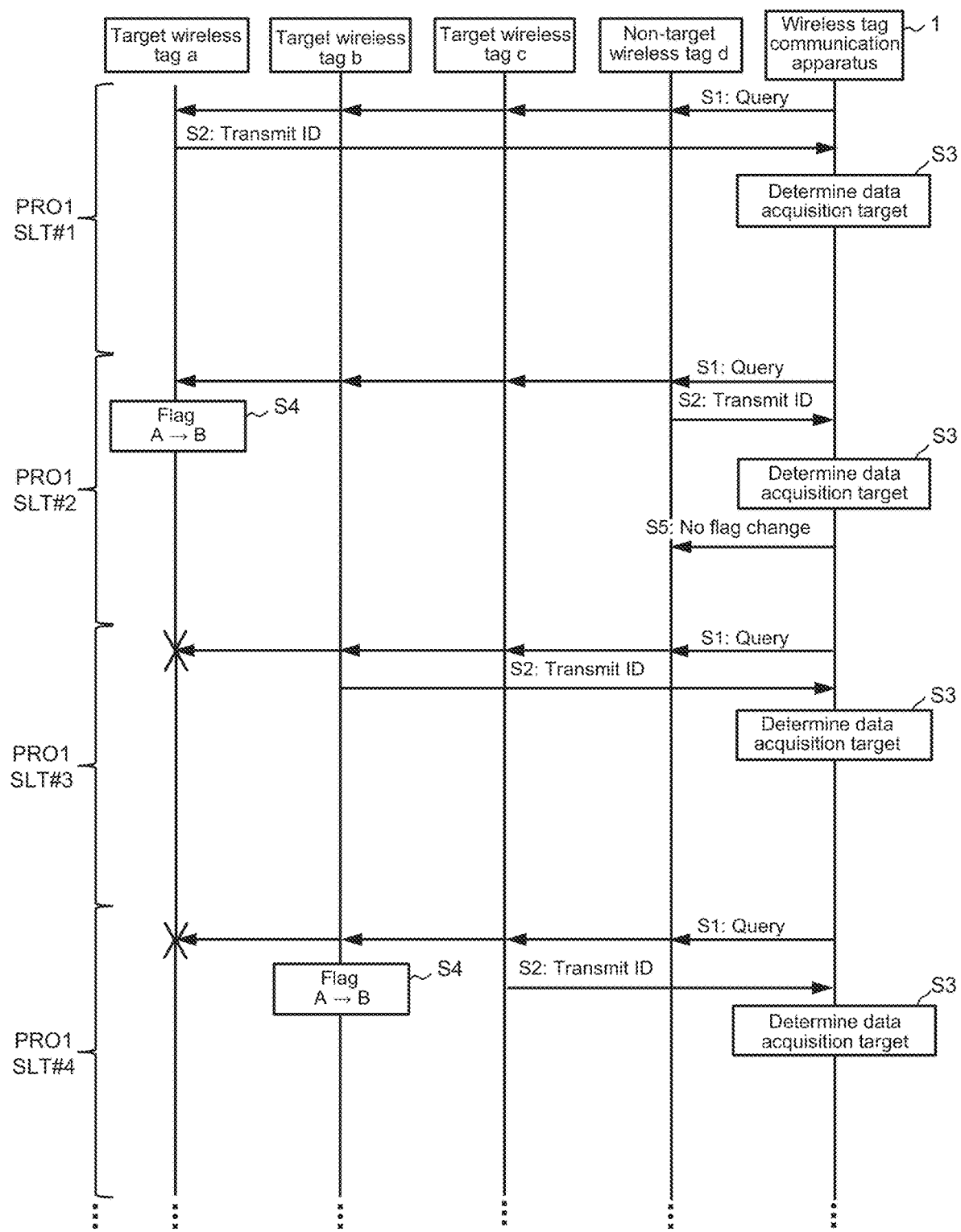
FIG. 8 is a sequence diagram showing an overview of an operation of the wireless tag communication apparatus.
Figure 9:
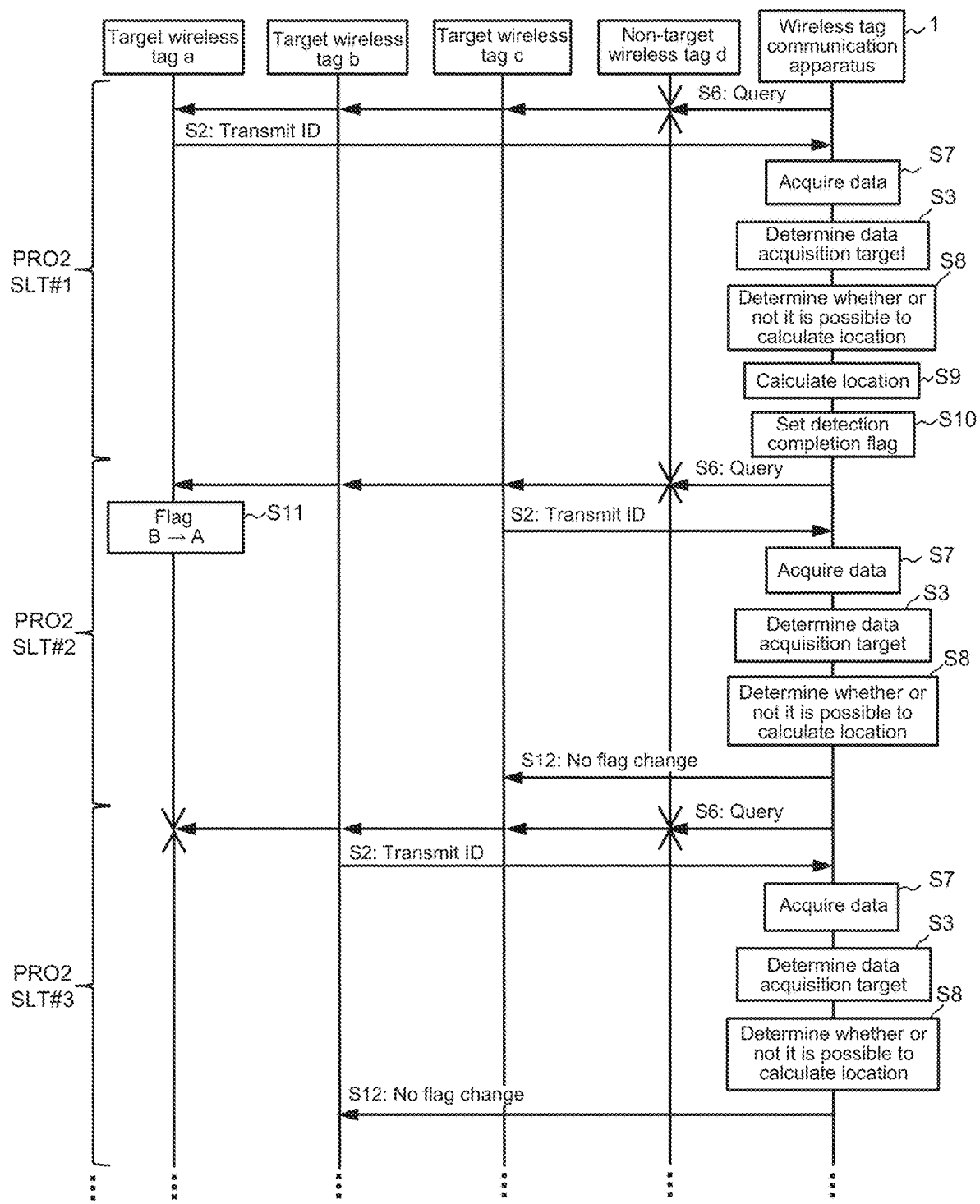
FIG. 9 is a sequence diagram showing the overview of the operation of the wireless tag communication apparatus.

Each of FIGS. 8 and 9 is a sequence diagram showing an overview of an operation of the wireless tag communication apparatus 1. FIG. 8 shows first processing process (PRO1) and FIG. 9 shows second processing process (PRO2). The first processing process is a process of determining the wireless tag TG whose location has not been detected, which has entered the communication area CA, as a reading target and communicating with only the determined reading target wireless tag TG in the second processing process. The second processing process is a process of calculating a location of the determined reading target wireless tag TG. It should be noted that FIGS. 8 and 9 each show an example in which four wireless tags TG, a target wireless tag a with identification information (tag ID) of "a", a target wireless tag b with identification information of "b", a target wireless tag c with identification information of "c", and a non-target wireless tag d with identification information of "d," have entered the communication area CA. It should be noted that FIGS. 8 and 9 each show an ideal case where the counter values are not the same. In reality, the plurality of wireless tags TG has the same counter value and the wireless tag communication apparatus 1 cannot receive the identification information (tag ID) in some cases.

As shown in FIG. 8, for example, in a slot 1 (SLT #1) of a first round in the first processing process (PRO1), the wireless tag communication apparatus 1 specifies the A value as the flag state and sends a query to the wireless tag TG that has entered the communication area CA (Step S1).

In response to the query sent from the wireless tag communication apparatus 1, for example, the target wireless tag a of the four wireless tags TG in the communication area CA transmits the identification information (tag ID) to the wireless tag communication apparatus 1 (Step S2).

When the wireless tag communication apparatus 1 receives the identification information transmitted from the target wireless tag a, the wireless tag communication apparatus 1 determines whether or not the identification information is an acquisition target of data for location detection, i.e., a reading target in the second processing process on the basis of contents stored in the detection target storage unit 21 and the location correction enable flag storage unit 22 (Step S3). Specifically, in a case where the received identification information has been stored in the detection target storage unit 21, i.e., the received identification information corresponds to the location detection target wireless tag TG and detection completion information associated with the corresponding identification information has not been detected, the wireless tag communication apparatus 1 determines the received identification information as a data acquisition target. Moreover, even if the detection completion information has been detected, the wireless tag communication apparatus 1 determines the received identification information as a data acquisition target in a case where it is necessary to correct the location correction enable flag stored in the location correction enable flag storage unit 22, i.e., it is necessary to correct the detected location of the wireless tag TG. When this determination ends, the wireless tag communication apparatus 1 terminates the processing in this slot.

In the next slot 2 (SLT #2), the wireless tag communication apparatus 1 specifies the A value as the flag state and sends a query to the wireless tag TG that has entered the communication area CA (Step S1).

The target wireless tag a that has received this query rewrites the flag state from the A value to the B value (Step S4). In other words, after the wireless tag TG transmits the identification information in response to the query from the wireless tag communication apparatus 1, the wireless tag TG rewrites the flag state at the time of receiving a query command for the next slot. Therefore, the target wireless tag a that has transmitted the identification information in the slot 1 (SLT #1) changes the flag state.

Moreover, for example, the non-target wireless tag d of the remaining three target wireless tag TG excluding the target wireless tag a that has already transmitted the identification information transmits the identification information (tag ID) to the wireless tag communication apparatus 1 in response to the query (Step S2).

When the wireless tag communication apparatus 1 receives the identification information transmitted from the non-target wireless tag d, the wireless tag communication apparatus 1 determines whether or not the identification information is an acquisition target of data for location detection, i.e., a reading target in the second processing process on the basis of contents stored in the detection target storage unit 21 and the location correction enable flag storage unit 22 (Step S3). The wireless tag communication apparatus 1 determines that the non-target wireless tag d with the received identification information is not the data acquisition target. In a case where the wireless tag communication apparatus 1 determines that the non-target wireless tag d is not the data acquisition target as such, the wireless tag communication apparatus 1 issues an instruction not to change the flag to the non-target wireless tag d (Step S5). Then, the wireless tag communication apparatus 1 terminates the processing in this slot.

In the next slot 3 (SLT #3), the wireless tag communication apparatus 1 specifies the A value as the flag state and sends a query to the wireless tag TG that has entered the communication area CA (Step S1). In this case, unlike the slot 2, the non-target wireless tag d has received the instruction not to change the flag, and therefore the non-target wireless tag d maintains the A value as the flag state.

It should be noted that the target wireless tag a whose flag state has been rewritten from the A value to the B value does not respond to the query specifying the A value as the flag state. That is, the target wireless tag a ignores this query. Therefore, for example, the target wireless tag b of the remaining two target wireless tags TG excluding the non-target wireless tag d that has already transmitted the identification information transmits the identification information (tag ID) to the wireless tag communication apparatus 1 in response to the query (Step S2).

When the wireless tag communication apparatus 1 receives the identification information transmitted from the target wireless tag b, the wireless tag communication apparatus 1 determines whether or not the identification information is an acquisition target of data for location detection, i.e., a reading target in the second processing process on the basis of contents stored in the detection target storage unit 21 and the location correction enable flag storage unit 22 (Step S3). The wireless tag communication apparatus 1 determines that the target wireless tag b with the received identification information is the data acquisition target. The wireless tag communication apparatus 1 has determined that the target wireless tag b is the data acquisition target, and therefore the wireless tag communication apparatus 1 does not issue the instruction not to change the flag here. When this determination ends, the wireless tag communication apparatus 1 terminates the processing in this slot.

In the next slot 4 (SLT #4), the wireless tag communication apparatus 1 specifies the A value as the flag state and sends a query to the wireless tag TG that has entered the communication area CA (Step S1).

The target wireless tag b that has received this query has not received the instruction not to change the flag, and therefore the target wireless tag b rewrites the flag state from the A value to the B value (Step S4).

Moreover, for example, the target wireless tag c of the remaining three target wireless tags TG excluding the target wireless tag b that has already transmitted the identification information and the non-target wireless tag d transmits the identification information (tag ID) to the wireless tag communication apparatus 1 in response to the query (Step S2).

When the wireless tag communication apparatus 1 receives the identification information transmitted from the target wireless tag c, the wireless tag communication apparatus 1 determines whether or not the identification information is an acquisition target of data for location detection, i.e., a reading target in the second processing process on the basis of contents stored in the detection target storage unit 21 and the location correction enable flag storage unit 22 (Step S3). The wireless tag communication apparatus 1 determines that the target wireless tag c with the received identification information is the data acquisition target. When this determination ends, the wireless tag communication apparatus 1 terminates the processing in this slot.

Thereafter, the respective wireless tags TG and the wireless tag communication apparatus 1 similarly perform the processing for the remaining slot(s) of this round, and further the subsequent round(s). This first processing process is performed until a predetermined period of time elapses or a predetermined number of rounds are processed. The predetermined number of rounds may be one round.

As shown in FIG. 9, the wireless tag communication apparatus 1 specifies the B value as the flag state and sends a query to the wireless tag TG that has entered the communication area CA, for example, in the slot 1 (SLT #1) of the n-th round of the second processing process (PRO2) (Step S6).

The non-target wireless tag d whose flag state maintains the A value does not respond to this query specifying the B value as the flag state. That is, the non-target wireless tag d ignores this query. Therefore, for example, the target wireless tag a of the remaining three target wireless tags TG whose flag states have been rewritten to the B value in the first processing process transmits the identification information (tag ID) to the wireless tag communication apparatus 1 in response to the query (Step S2).

The wireless tag communication apparatus 1 receives the identification information transmitted from the target wireless tag a. At the time of receiving this identification information, the wireless tag communication apparatus 1 acquires data for location detection, i.e., a time of acquisition, an RSSI, and a phase (Step S7). The wireless tag communication apparatus 1 stores the acquired data for location detection in association with the received identification information in the read data storage unit 23. It should be noted that the apparatus location in the data for location detection is stored in the read data storage unit 23 in a phase in which the apparatus location has been calculated. In each slot of each round up to the n-th round, similarly, the wireless tag communication apparatus 1 reads the identification information of the location detection target wireless tag TG, acquires data for location detection, and stores the acquired data for location detection in the read data storage unit 23 in association with the received identification information.

On the basis of contents stored in the detection target storage unit 21 and the location correction enable flag storage unit 22, the wireless tag communication apparatus 1 determines whether or not the received identification information corresponds to an acquisition target of data for location detection, i.e., a reading target (Step S3). The wireless tag communication apparatus 1 determines that the target wireless tag a with the received identification information is the data acquisition target.

Then, the wireless tag communication apparatus 1 determines whether or not it is possible to calculate the location of the target wireless tag TG with the received identification information from the data stored in the read data storage unit 23 (Step S8). In a case where it is impossible to calculate the location, the wireless tag communication apparatus 1 terminates the processing in this slot.

In contrast, in a case where it is possible to calculate the location of the target wireless tag a, the wireless tag communication apparatus 1 calculates the location of the target wireless tag a on the basis of the data stored in the read data storage unit 23 for location detection (Step S9). The wireless tag communication apparatus 1 stores the location of the calculated target wireless tag a in the location calculation result storage unit 24.

Moreover, the wireless tag communication apparatus 1 sets detection completion to the detection completion information associated with the identification information of the target wireless tag a that is the corresponding wireless tag TG in the detection target storage unit 21 (Step S10). Then, the wireless tag communication apparatus 1 terminates the processing in this slot.

In the next slot 2 (SLT #2), the wireless tag communication apparatus 1 specifies the B value as the flag state and sends a query to the wireless tag TG that has entered the communication area CA (Step S6).

The target wireless tag a that has received this query rewrites the flag state from the B value to the A value (Step S11).

Moreover, for example, the target wireless tag c of the remaining two target wireless tags TG whose flag state has been set to be the B value transmits the identification information (tag ID) to the wireless tag communication apparatus 1 in response to the query (Step S2).

When the wireless tag communication apparatus 1 receives the identification information transmitted from the target wireless tag c, the wireless tag communication apparatus 1 acquires data for location detection, i.e., a time of acquisition, an RSSI, and a phase (Step S7). Then, the wireless tag communication apparatus 1 determines whether or not the identification information is an acquisition target of data for location detection, i.e., a reading target on the basis of contents stored in the detection target storage unit 21 and the location correction enable flag storage unit 22 (Step S3). In a case where the received identification information corresponds to the data acquisition target, the wireless tag communication apparatus 1 further determines whether or not it is possible to calculate the location of the target wireless tag c with the received identification information from the data stored in the read data storage unit 23 (Step S8). In a case where it is impossible to calculate the location, the wireless tag communication apparatus 1 issues an instruction not to change the flag (Step S12) and terminates the processing of this slot.

In the next slot 3 (SLT #3), the wireless tag communication apparatus 1 sends a query specifying the B value as the flag state (Step S6). In this case, the target wireless tag c that has transmitted the identification information in the slot 2 (SLT #2) that is the previous slot has received the instruction not to change the flag, and therefore the target wireless tag c maintains the B value as the flag state. Moreover, the target wireless tag a whose flag state has been rewritten from the B value to the A value does not respond to this query specifying the B value as the flag state. That is, the target wireless tag a ignores this query. Therefore, for example, the target wireless tag b of the remaining target wireless tags TG excluding the non-target wireless tag c that has already transmitted the identification information transmits the identification information (tag ID) to the wireless tag communication apparatus 1 in response to the query (Step S2).

When the wireless tag communication apparatus 1 receives the identification information transmitted from the target wireless tag b, the wireless tag communication apparatus 1 acquires the data for location detection (Step S7). Then, the wireless tag communication apparatus 1 determines whether or not the identification information is an acquisition target of data for location detection, i.e., a reading target on the basis of contents stored in the detection target storage unit 21 and the location correction enable flag storage unit 22 (Step S3). In a case where the received identification information corresponds to the data acquisition target, the wireless tag communication apparatus 1 further determines whether or not it is possible to calculate the location of the target wireless tag a with the received identification information from the data stored in the read data storage unit 23 (Step S8). In a case where it is impossible to calculate the location, the wireless tag communication apparatus 1 issues an instruction to change the flag (Step S11) and terminates the processing of this slot.

Thereafter, the respective wireless tags TG and the wireless tag communication apparatus 1 similarly perform the processing for the remaining slot(s) of this round, and further the subsequent round(s). This second processing process is performed until a predetermined period of time elapses or a predetermined number of rounds are processed.

Figure 10:
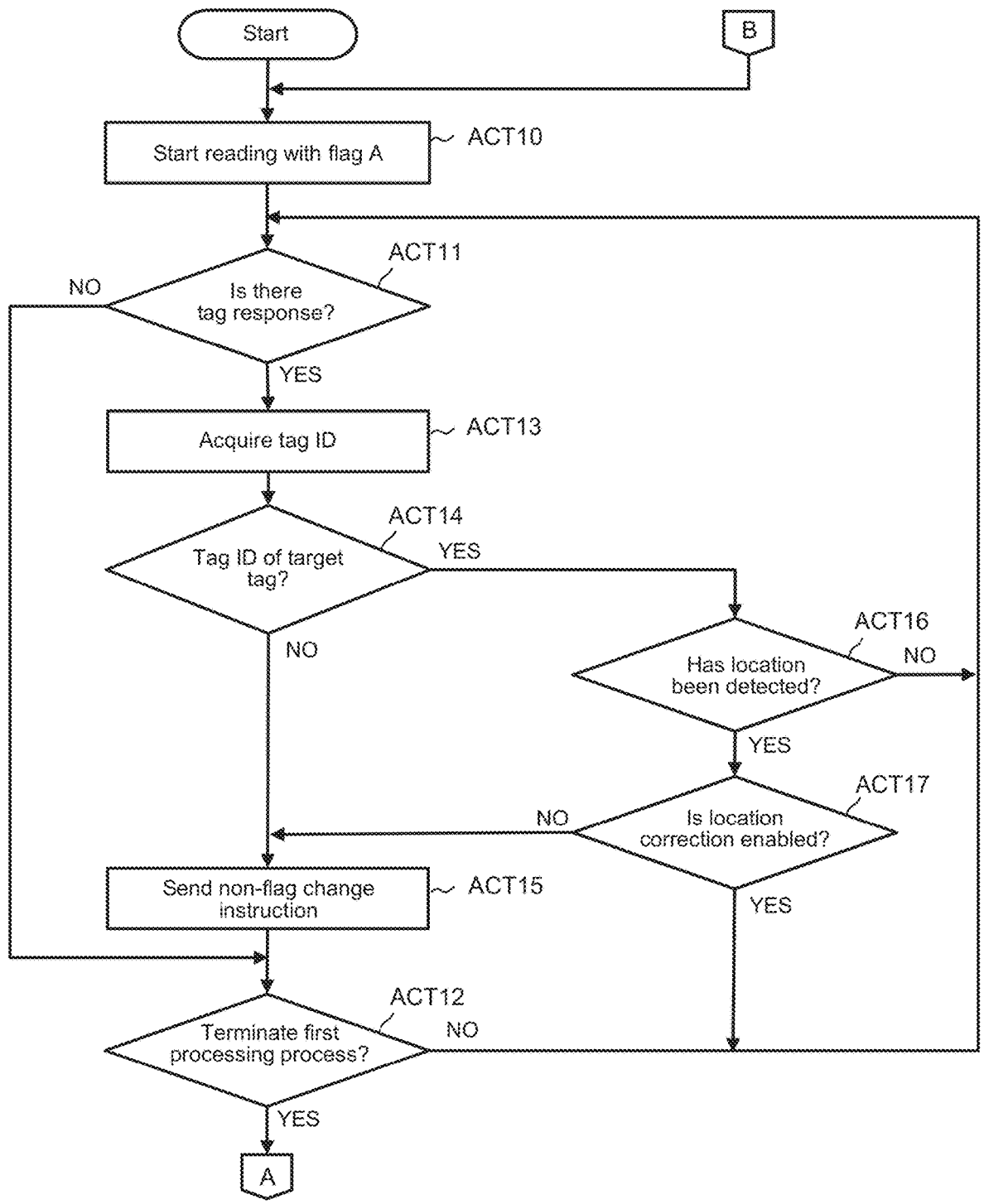
FIG. 10 is a diagram showing a first part of a flow diagram showing a main-part procedure of information processing executed by a processor of the wireless tag communication apparatus.
Figure 11:
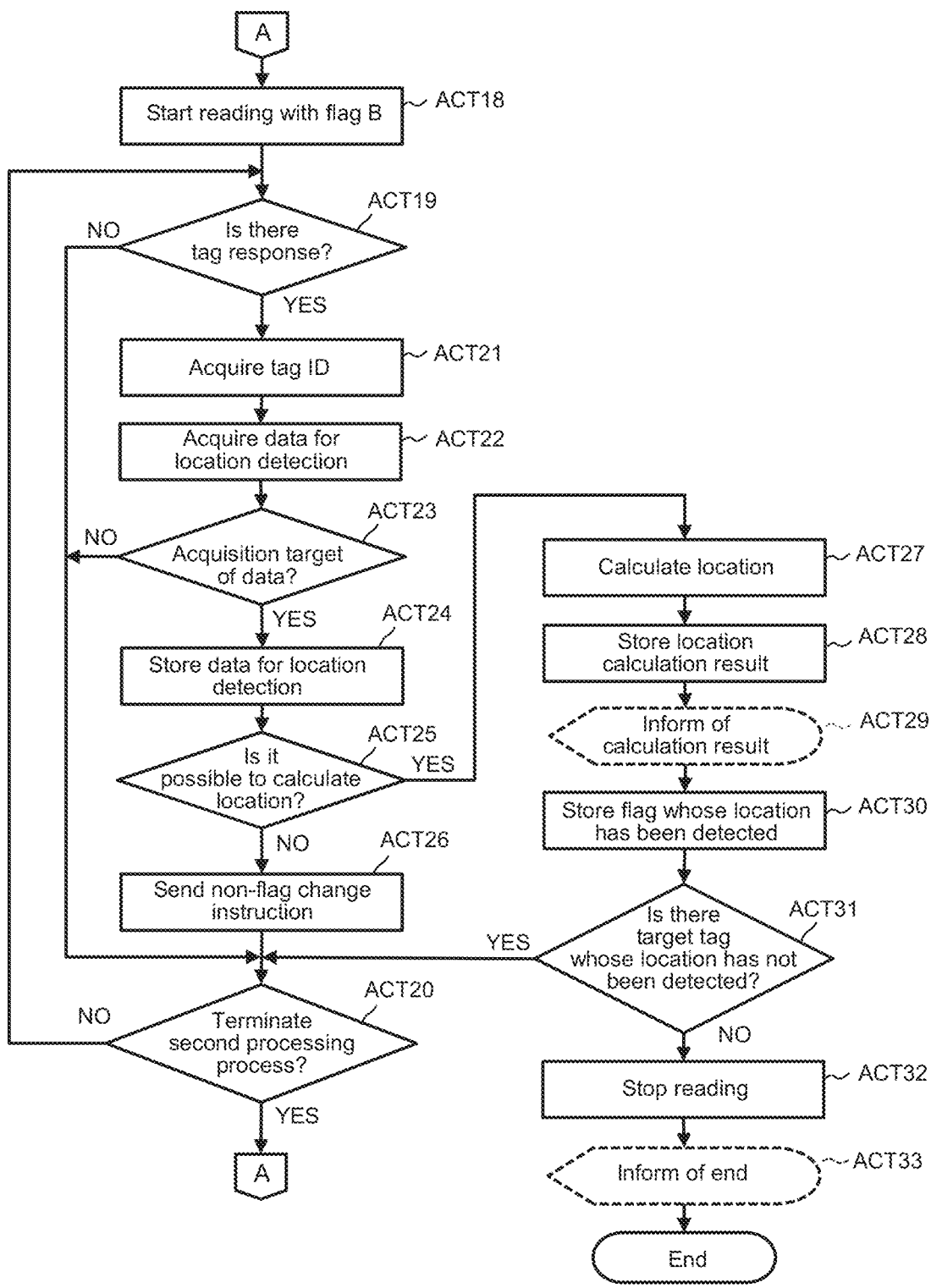
FIG. 11 is a diagram showing a second part of the flow diagram showing the main-part procedure of the information processing executed by the processor of the wireless tag communication apparatus.

Next, a specific example of the operation of the wireless tag communication apparatus 1 will be described. FIGS. 10 and 11 are a series of flow diagrams showing a main-part procedure of the information processing that is performed by the processor 10 of the wireless tag communication apparatus 1. The processor 10 receives, for example, a start operation via the input device 30 or a start instruction via the communication interface 70 from the upper-level equipment UE and performs this processing on the basis of the control program stored in the memory 20. It should be noted that unless otherwise explained, it is assumed that the processing operation of the processor 10 transitions to ACT(x+1) after ACTx (x is a natural number). Moreover, the procedure shown in FIGS. 10 and 11 is an example. The procedure is not particularly limited as long as a similar result can be obtained.

As ACT10, the processor 10 causes the wireless communication device 60 to operate and starts reading of the wireless tag TG, specifying the A value as the flag state.

As ACT11, the processor 10 determines whether or not there is a response from any one wireless tag TG, i.e., whether or not the processor 10 has received a response via the wireless communication device 60. In a case where there is no response, the processor 10 determines NO in ACT11 and shifts to ACT12. Moreover, in a case where there is a response, the processor 10 determines YES in ACT11 and shifts to ACT13.

As ACT12, the processor 10 determines whether or not to terminate the first processing process. Specifically, the processor 10 performs this determination on the basis of whether or not a predetermined period of time has elapsed after the processor 10 starts the reading. Alternatively, the processor 10 performs this determination on the basis of whether or not the processor 10 has performed a predetermined number of rounds after the processor 10 starts the reading. The predetermined number of rounds may be a single round. Not to terminate the first processing process, the processor 10 determines NO in ACT12 and shifts to ACT11. To terminate the first processing process, the processor 10 determines YES in ACT12 and shifts to ACT18.

As ACT13, the processor 10 acquires the tag ID of the wireless tag TG that has transmitted the response, i.e., the identification information. Specifically, the processor 10 sends ACK to the wireless tag TG that has transmitted the response and receives the tag ID accordingly transmitted from the corresponding wireless tag TG via the wireless communication device 60. The processor 10 stores the tag ID received by the wireless communication device 60 in the work area of the memory 20.

As ACT14, the processor 10 determines whether or not the received tag ID is the tag ID of the location detection target wireless tag TG. Specifically, the processor 10 checks whether or not the tag ID, i.e., the identification information matching the tag ID stored in the work area has been stored in the detection target storage unit 21. In a case where no matching identification information has been stored, the processor 10 determines that the received tag ID is not the tag ID of the location detection target wireless tag TG, determines NO in ACT14, and shifts to ACT15. Moreover, in a case where the received tag ID is the tag ID of the location detection target wireless tag TG, the processor 10 determines YES in ACT14 and shifts to ACT16.

As ACT15, the processor 10 sends a non-flag change instruction for instructing not to rewrite the flag state to the non-location detection target wireless tag TG via the wireless communication device 60. Then, the processor 10 shifts to ACT12.

As ACT16, the processor 10 determines whether or not the location of the wireless tag TG determined as being the location detection target has been detected. Specifically, the processor 10 checks the detection completion information associated with the corresponding identification information stored in the detection target storage unit 21 and determines whether or not the detection completion information indicates the detection completion. That is, on the basis of the detection completion information stored in the detection target storage unit 21 in association with the acquired identification information, the processor 10 determines whether or not the wireless tag TG that has transmitted the identification information is the wireless tag that is the location detection target whose location has been detected. In a case where the location has been detected, the processor 10 determines YES in ACT16 and shifts to ACT17. In a case where the location has not been detected, the processor 10 determines NO in ACT16 and shifts to ACT11. In this manner, the processor 10 does not send the non-flag change instruction unless the location of the wireless tag TG that has transmitted the identification information has been detected. Accordingly, it is possible to cause the flag state of the wireless tag TG to be rewritten from the A value to the B value in response to the query in the next slot, i.e., set the wireless tag TG as a reading target. The processor 10 is thus an example of a first processing functional part that causes the wireless communication device 60 to send the identification information reading command specifying the A value as the flag state to thereby acquire the identification information of the wireless tag TG whose flag state is the A value and, in a case where the processor 10 determines the detection target wireless tag TG whose location has not been detected as the wireless tag that is the reading target on the basis of the identification information, performs first processing of causing the flag state of the determined wireless tag to be rewritten from the A value to the B value.

As ACT17, the processor 10 determines whether or not the location correction is enabled by checking the location correction enable flag indicating whether or not it is necessary to correct the detected location of the wireless tag TG, the location correction enable flag having been stored in the location correction enable flag storage unit 22.

In a case where the location correction is disabled, i.e., in a case where the location correction is not to be performed, it is unnecessary to read the target wireless tag TG whose location has been detected. Therefore, unless the location correction is enabled, the processor 10 determines NO in ACT17 and shifts to ACT15. Accordingly, in ACT15, the processor 10 sends a non-flag change instruction for instructing not to rewrite the flag state to the wireless tag TG whose location has been detected via the wireless communication device 60. In this manner, in a case where the setting stored in the location correction enable flag storage unit 22 is not a setting to correct the location, the processor 10 is capable of preventing the wireless tag TG from being set as the reading target.

In contrast, in a case of performing location detection with increased accuracy by further using data for location detection, which is thereafter acquired even in a case where the location correction is enabled, i.e., the location has been detected, the processor 10 determines YES in ACT17 and shifts to ACT11. Accordingly, it is possible to cause the flag state of the wireless tag TG to be rewritten from the A value to the B value in response to the query in the next slot, i.e., set the wireless tag TG as a reading target.

As ACT18, the processor 10 causes the wireless communication device 60 to operate and starts reading of the wireless tag TG, specifying the B value as the flag state.

As ACT19, the processor 10 determines whether or not there is a response from any one wireless tag TG, i.e., whether or not the processor 10 has received a response via the wireless communication device 60. The wireless tag TG that transmits this response is only a target wireless tag TG whose location has not been detected, whose flag state has been rewritten to the B value as being a reading target in the first processing process. That is, the non-location detection target wireless tag TG and the non-reading target wireless tag TG whose location has already been detected transmit no response. In a case where there is no response, the processor 10 determines NO in ACT19 and shifts to ACT20. Moreover, in a case where there is a response, the processor 10 determines YES in ACT19 and shifts to ACT21.

As ACT20, the processor 10 determines whether or not to terminate the second processing process. The second processing process is continued until the processor 10 acquires the identification information from the reading target wireless tag TG multiple times. Specifically, the processor 10 performs this determination on the basis of whether or not a predetermined period of time has elapsed after the processor 10 starts the reading, specifying the B value as the flag state. The predetermined period of time is desirably longer than the predetermined period of time in ACT12. Alternatively, the processor 10 performs this determination on the basis of whether or not the processor 10 has performed a predetermined number of rounds after the processor 10 starts the reading. The predetermined number of rounds are desirably larger than the number of rounds in ACT12. Not to terminate the second processing process, the processor 10 determines NO in ACT20 and shifts to ACT19. To terminate the second processing process, the processor 10 determines YES in ACT20 and shifts to ACT10. In this manner, the processor 10 performs the processing of the first processing unit again after a predetermined time elapses or the processor 10 performs processing of acquiring the identification information only from the reading target wireless tag TG whose flag state is the B value a predetermined number of times after the processor 10 causes the flag state of the wireless tag TG to be rewritten from the A value to the B value.

As ACT21, the processor 10 acquires the tag ID of the wireless tag TG that has transmitted the response, i.e., the identification information. Specifically, the processor 10 sends ACK to the wireless tag TG that has transmitted the response and receives the tag ID accordingly transmitted from the corresponding wireless tag TG via the wireless communication device 60. The processor 10 stores the tag ID received by the wireless communication device 60 in the work area of the memory 20.

As ACT22, the processor 10 acquires the data for location detection. Specifically, the processor 10 acquires a time (current time or elapsed time) and detects an RSSI and a phase via the RSSI detector 63 and the phase detector 64 of the wireless communication device 60. Moreover, on the basis of a detection result of the sensor 50, the processor 10 calculates location and orientation of the wireless tag communication apparatus 1, more particularly, the antenna 61. In this manner, the processor 10 acquires the data for location detection by the use of the sensor 50, the RSSI detector 63, and the phase detector 64 when receiving the tag ID from the wireless tag TG whose flag value is set to be the B value. Therefore, when the processor 10 acquires the identification information from the reading target wireless tag TG whose flag state is the B value, the processor 10 is an example of a state detection functional part that detects a communication state with the wireless tag TG by the wireless communication device 60. The processor 10 stores the acquired data for location detection in the work area of the memory 20.

As ACT23, the processor 10 determines whether or not the wireless tag TG is an acquisition target of data for location detection on the basis of the tag ID, i.e., the identification information stored in the work area. For example, the processor is capable of making this determination by making a determination similar to those in ACT14, ACT16, and ACT17 described above. Basically, in the second processing process, only the wireless tag TG set as a reading target of the identification information should transmit a response, in some cases, the non-target wireless tag TG whose flag state has been set to be the B value transmits a response via another wireless tag communication apparatus. Therefore, here, whether the data for location detection according to the response of the identification information from the target wireless tag TG has been acquired is checked. Therefore, this ACT23 is not essential. In a case where the wireless tag TG is not an acquisition target of data for location detection, the processor 10 determines NO in ACT23 and shifts to ACT20. At this time, the tag ID, i.e., the identification information stored in the work area and the data for location detection are cleared, i.e., deleted. In a case where the wireless tag TG is an acquisition target of data for location detection, the processor 10 determines YES in ACT23 and shifts to ACT24.

As ACT24, the processor 10 stores the data for location detection that has been acquired and stored in the work area in the read data storage unit 23 in association with the tag ID, i.e., the identification information also stored in the work area.

As ACT25, the processor 10 determines whether or not it is possible to detect the location of the wireless tag TG on the basis of the data for location detection stored in the read data storage unit 23. For example, in a case of calculating the location by three-point measurement, the processor 10 is capable of determining that it is possible to calculate the location in a case where the number of RSSIs stored in the read data storage unit 23 in association with the identification information of the wireless tag TG is equal to or larger than a predetermined number. Moreover, in a case of calculating the location on the basis of the phase, the processor 10 is capable of determining that it is possible to calculate the location in a case where the slope of the phase change stored in the read data storage unit 23 in association with the identification information of the wireless tag TG is reversed. In either case, in consideration of the possibility of erroneous detection of the data for detection due to noise or the like, a configuration to determine that it is possible to calculate the location is desirably made in a phase in which the data for detection has been acquired somewhat excessively, not to immediately determine that it is possible to calculate the location. In a case where it is possible to calculate the location, the processor 10 determines YES in ACT25 and shifts to ACT27. In a case where it is impossible to calculate the location, the processor 10 determines NO in ACT25 and shifts to ACT26. The processor 10 is thus an example of a second processing functional part that transmits the identification information reading command specifying the B value as the flag state via the wireless communication device 60 to thereby perform second processing of acquiring the identification information only from the reading target wireless tag TG whose flag state is the B value.

As ACT26, the processor 10 sends a non-flag change instruction for instructing not to rewrite the flag state to the wireless tag TG that has transmitted the identification information via the wireless communication device 60. Then, the processor 10 shifts to ACT20.

As ACT27, the processor 10 calculates a location of the wireless tag TG on the basis of the data for location detection stored in the read data storage unit 23. The processor 10 is an example of a location detection functional part that detects the location of the wireless tag TG on the basis of the detected communication state.

As ACT28, the processor 10 stores the calculated location in the location calculation result storage unit 24 in association with the identification information of the wireless tag TG.

As ACT29, the processor 10 informs of the calculation result via the output device 40. It should be noted that in a case of scanning the orientation of the wireless tag communication apparatus 1, staying at a single point, or continuously performing the reading while moving the wireless tag communication apparatus 1, this ACT29 may be omitted.

As ACT30, the processor 10 stores the flag whose location has been detected. Specifically, the processor 10 sets detection completion to the detection completion information stored in the detection target storage unit 21 in association with the identification information of the wireless tag TG whose location has been detected. In this manner, in a case where the processor 10 has detected the location of the wireless tag TG, the processor 10 is an example of a storage control functional part that sets the detection completion information stored in the detection target storage unit 21 in association with the identification information of the wireless tag TG to be one indicating that the location has been detected.

As ACT31, the processor 10 determines whether or not there is a target wireless tag whose location has not been detected. Specifically, the processor 10 determines whether or not there is identification information whose the detection completion information has not been detected in the detection target storage unit 21. In a case where there is a target wireless tag whose location has not been detected, the processor 10 determines YES in ACT31 and shifts to ACT20. It should be noted that in a case where one round ends at this time, the processor 10 starts the next round. Moreover, when the user performs a reading method of performing reading with the wireless tag communication apparatus 1 oriented toward a single direction at a single point and similarly performing reading after moving the wireless tag communication apparatus 1 to another point, in a case where there is a target wireless tag whose location has not been detected, the user may be informed of it via the output device 40 so that the user can be encouraged to move the wireless tag communication apparatus 1 to the other point. Moreover, in a case where there is no target wireless tag whose location has not been detected, i.e., the locations of all the wireless tags TG that are the location detection targets have been detected, the processor 10 determines NO in ACT31 and shifts to ACT32.

As ACT32, the processor 10 terminates the operation of the wireless communication device 60 and stops the reading of the wireless tag TG in which the B value is specified as the flag state.

As ACT33, the processor 10 informs of the end of the read via the output device 40. At this time, the processor 10 may also inform of the location calculation result of the detection target wireless tag TG together. Moreover, this ACT33 may be omitted. Then, the processor 10 terminates this reading operation.

It should be noted that the processor 10 may send the location calculation result or the reading end notification to the upper-level equipment UE via the communication interface 70.

As described above, in accordance with the wireless tag communication apparatus 1 according to the first embodiment, on the basis of the identification information of the plurality of wireless tags TG, which is acquired by transmitting the identification information reading command specifying the A value as the flag state via the wireless communication device 60 that communicates with the wireless tag TG that includes the flag that stores the flag state that is either one of for example, the A value, which is the first state, and for example, the B value, which is the second state, and transmits the identification information only in a case where the flag state corresponds to the specified flag state when receiving the identification information reading command specifying the flag state, the processor 10 determines a wireless tag that is a reading target TG from the detection target wireless tags TG whose locations have not been detected and causes the flag state of the determined wireless tag TG to be rewritten from the A value to the B value via the wireless communication device 60. Then, the processor 10 causes the wireless communication device 60 to send the identification information reading command specifying the B value as the flag state to thereby repeat acquisition of the identification information only from the reading target wireless tag TG multiple times, for example, until a predetermined period of time elapses after the processor 10 starts the reading, specifying the B value, or until a predetermined number of rounds are performed after the processor 10 starts the reading. In this manner, in accordance with the wireless tag communication apparatus 1 according to the first embodiment, first of all, the processor 10 acquires the identification information from the wireless tag TG in accordance with the identification information reading command specifying the A value and rewrites the flag state to the B value only with respect to the detection target wireless tag TG whose location has not been detected yet to thereby reduce the reading target wireless tags TG, and then repeats acquisition of the identification information from the wireless tag TG in accordance with the identification information reading command specifying the B value. Therefore, the wireless tag TG whose location has been detected and the non-location detection target wireless tag TG can be prevented from responding to the identification information reading command specifying, for example, the A value that is the first state in the subsequent slot or round. Therefore, the wireless tag TG whose location has been detected and the non-location detection target wireless tag TG do not deprive the opportunity to read the wireless tag TG whose location has not been detected, i.e., the opportunity to read the wireless tag TG whose location has not been detected increases as compared to the conventional reading method. Therefore, in accordance with the wireless tag communication apparatus 1 according to the first embodiment, it is possible to reduce the time to read all wireless tags that are a plurality of location detection targets.

Moreover, the wireless tag communication apparatus 1 according to the first embodiment further includes the detection target storage unit 21 that is a storage unit that stores the detection completion information indicating whether or not the location of the wireless tag TG has been detected in association with the identification information of each of the one or more detection target wireless tags TG. The processor 10 determines whether or not the wireless tag TG that has transmitted the identification information is the wireless tag that is the location detection target whose location has been detected on the basis of the detection completion information stored in the detection target storage unit 21 in association with the acquired identification information. Therefore, in accordance with the wireless tag communication apparatus 1 according to the first embodiment, it is possible to easily determine whether or not the wireless tag TG that has transmitted the identification information is the wireless tag that is the location detection target whose location has been detected.

Moreover, the wireless tag communication apparatus 1 according to the first embodiment further includes the location correction enable flag storage unit 22 that is a setting storage unit that stores the location correction enable flag indicating a setting as to whether or not to correct the location of the wireless tag TG whose location has been detected. In a case where the setting stored in the location correction enable flag storage unit 22 is a setting to correct the location, the processor 10 also determines the wireless tag TG with the identification information, with respect to which the location detection completion has been stored in the detection target storage unit 21, as the reading target wireless tag TG. Therefore, in accordance with the wireless tag communication apparatus 1 according to the first embodiment, it is possible to detect the location with increased accuracy by further using data for location detection, which is thereafter acquired even in a case where the location of the wireless tag TG has been detected.

Moreover, the wireless tag communication apparatus 1 according to the first embodiment further includes the RSSI detector 63 and/or the phase detector 64 as state detectors that detect the communication state with the wireless tag TG by the wireless communication device 60 when acquiring the identification information from the reading target wireless tag TG. The processor 10 detects the location of the wireless tag TG on the basis of the detected communication state. Therefore, in accordance with the wireless tag communication apparatus 1 according to the first embodiment, it is possible to detect the location of the wireless tag TG on the basis of the communication state with the reading target wireless tag TG by the wireless communication device 60.

Moreover, the wireless tag communication apparatus 1 according to the first embodiment causes the first processing process (PRO1) to be performed again after a predetermined period of time elapses after the flag state of the wireless tag TG to be rewritten from the A value to the B value or after processing of acquiring the identification information is performed only from the reading target wireless tag TG whose flag state is the B value a predetermined number of times in the second processing process (PRO2). Therefore, in accordance with the wireless tag communication apparatus 1 according to the first embodiment, it is possible to reliably read all the wireless tags TG that are a plurality of location detection targets by repeating the first and second processing processes. In particular, such repeated processing can enhance the reliability of reading a large number of wireless tags TG when continuously reading the large number of wireless tags TG while moving the wireless tag communication apparatus 1 to a plurality of points.

Moreover, in the wireless tag communication apparatus 1 according to the first embodiment, in a case where the processor 10 has detected the location of the wireless tag TG, the processor 10 sets the detection completion information stored in the detection target storage unit 21 in association with the identification information of the wireless tag TG to be one indicating that the location has been detected. Therefore, in accordance with the wireless tag communication apparatus 1 according to the first embodiment, by updating the contents of the detection target storage unit 21 in accordance with the location detection of the wireless tag TG, it is possible to use the updated contents for determining the detected wireless tag TG in the subsequent slot or round.

Moreover, the wireless tag communication system according to the first embodiment includes the wireless tag communication apparatus 1 according to the first embodiment and the upper-level equipment UE that is connected to the wireless tag communication apparatus 1 and controls the wireless tag communication apparatus 1. The detection target storage unit 21 of the wireless tag communication apparatus 1 stores the identification information of the location detection target wireless tag TG set from the upper-level equipment UE. Therefore, in accordance with the wireless tag communication system according to the first embodiment, it is possible to easily set the location detection target wireless tag TG.

Second Embodiment

Next, a second embodiment will be described. It should be noted that configurations and operations similar to those of the first embodiment will be denoted by reference signs similar to those of the first embodiment and descriptions thereof will be omitted.

Figure 12:
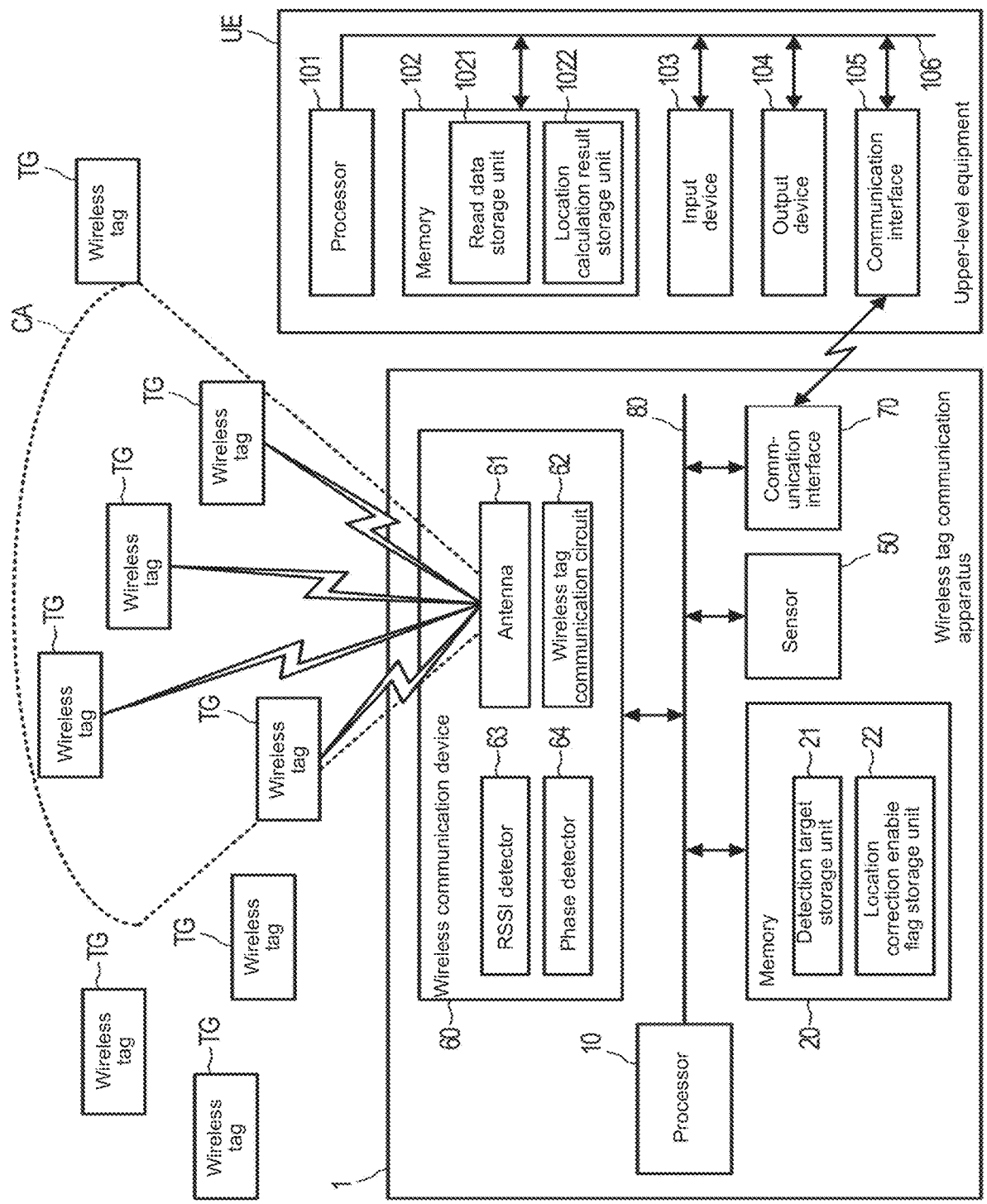
FIG. 12 is a schematic configuration diagram showing a wireless tag communication system according to a second embodiment.

FIG. 12 is a schematic configuration diagram showing a wireless tag communication system according to the second embodiment. In the present embodiment, a wireless tag communication apparatus 1 according to the second embodiment and upper-level equipment UE cooperate to carry out location detection of the wireless tag TG.

The wireless tag communication apparatus 1 includes a detection target storage unit 21 and a location correction enable flag storage unit 22 in a memory 20. In the present embodiment, the wireless tag communication apparatus 1 does not includes the input device 30 and the output device 40.

The upper-level equipment UE includes a processor 101, a memory 102, an input device 103, an output device 104, a communication interface 105, and a system communication channel 106. It should be noted that also in FIG. 12, the "interface" is abbreviated as "I/F." The system communication channel 106 includes an address bus, a data bus, a control signal line, and the like. The system communication channel 106 connects the processor 101 and the other respective units directly or via a signal input/output circuit and transmits data signals exchanged between them. By connecting the processor 101 and the memory 102 to each other via the system communication channel 106, a computer of the upper-level equipment UE is configured. The memory 102 includes a read data storage unit 1021 and a location calculation result storage unit 1022. The read data storage unit 1021 and the location calculation result storage unit 1022 correspond to the read data storage unit 23 and the location calculation result storage unit 24 in the first embodiment. The input device 103 is an operation switch, an operation button, or the like. The output device 104 is, for example, a display device such as a liquid-crystal display or an LED or an acoustic device such as a buzzer or a loudspeaker. Moreover, the input device 103 and the output device 104 may be configured as a touch panel with touch keys arranged on a display screen of a liquid-crystal display or the like.

Figure 13:
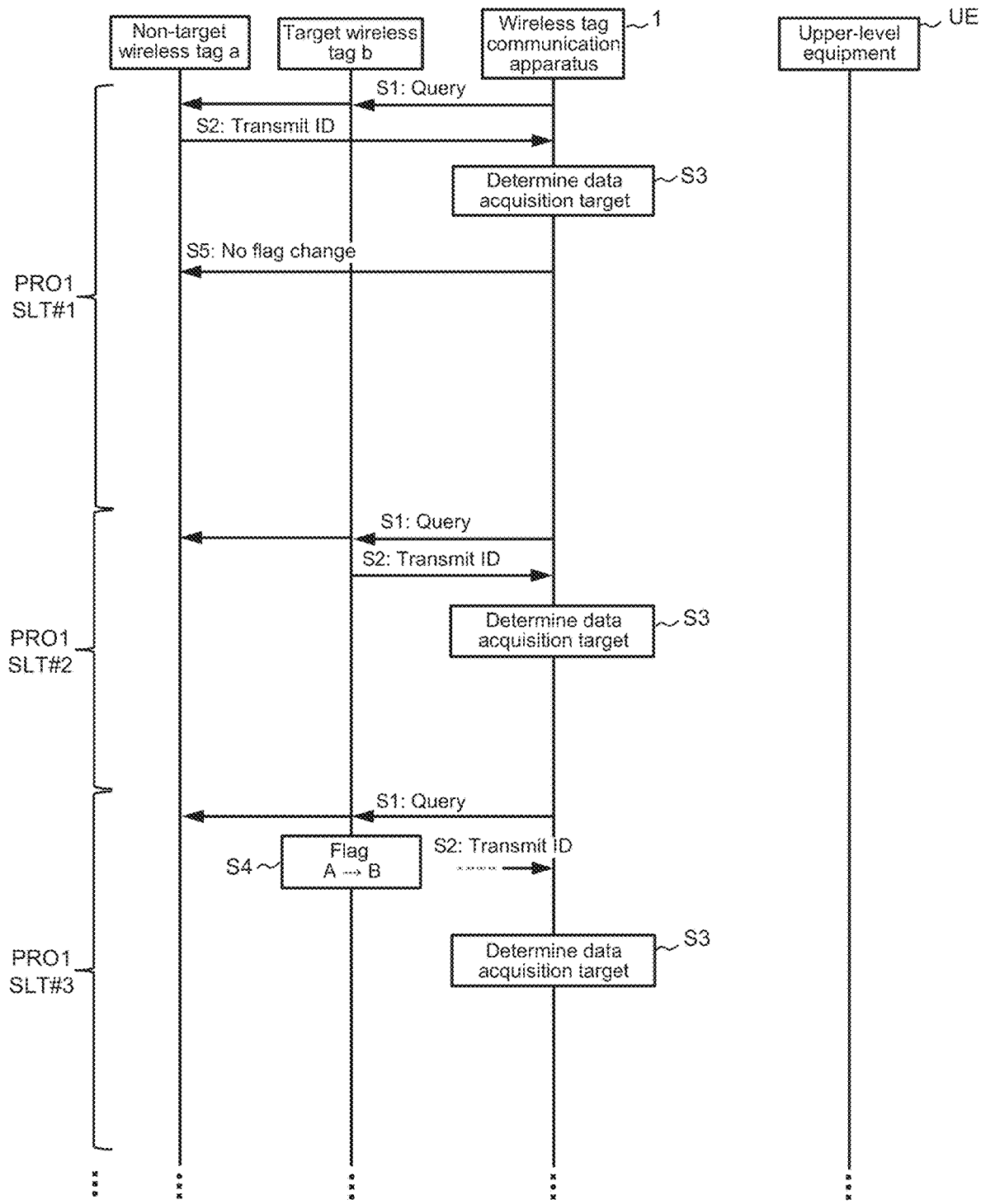
FIG. 13 is a sequence diagram showing an overview of an operation of the wireless tag communication system.
Figure 14:
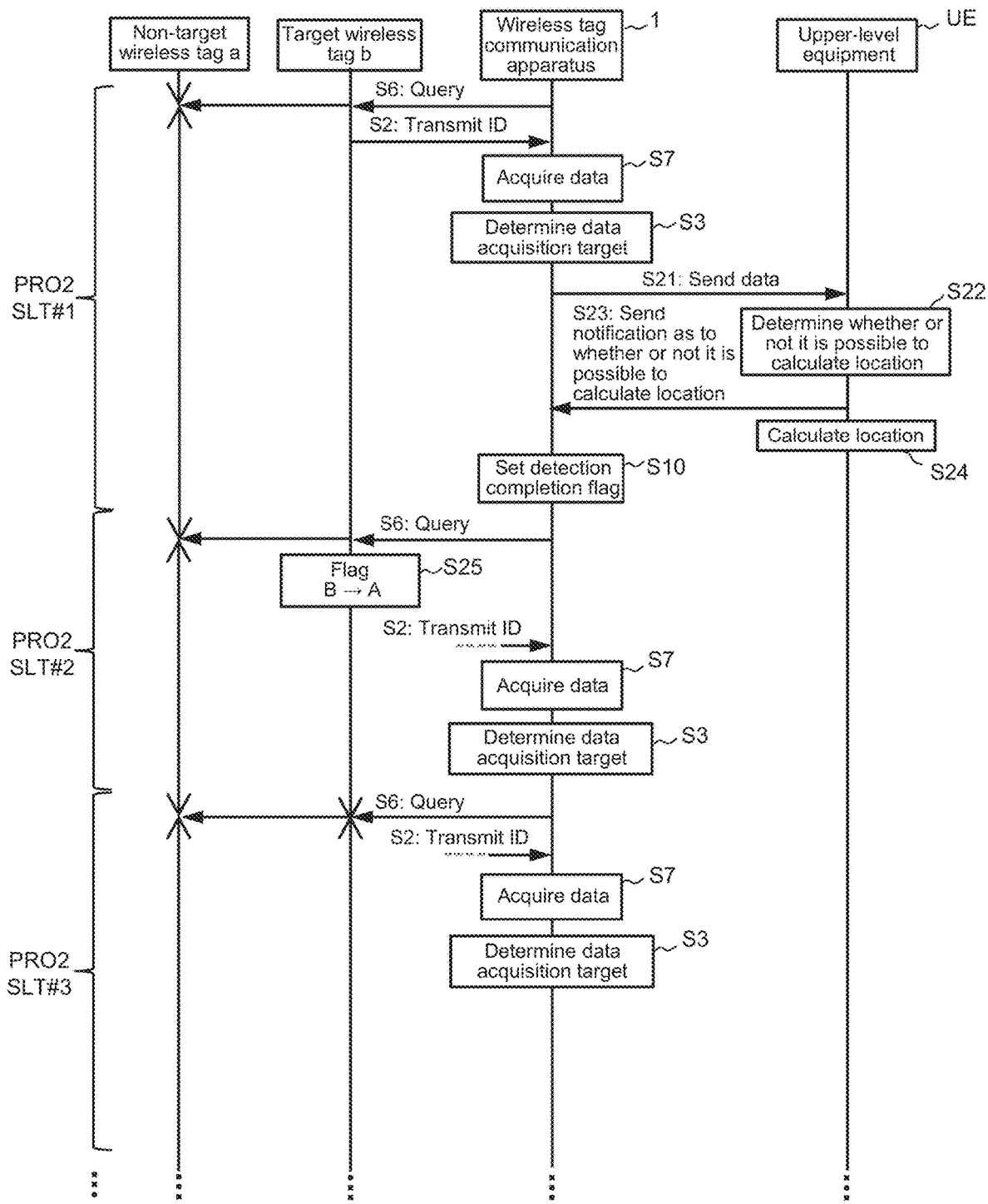
FIG. 14 is a sequence diagram showing the overview of the operation of the wireless tag communication system.

Each of FIGS. 13 and 14 is a sequence diagram showing an overview of an operation of the wireless tag communication system. FIG. 13 shows first processing process (PRO1) and FIG. 14 shows second processing process (PRO2). It is assumed that in FIGS. 13 and 14, a non-target wireless tag a with identification information (tag ID) of "a", a target wireless tag b with identification information of "b", . . . have entered the communication area CA. It should be noted that although only one non-target wireless tag TG and one target wireless tag TG are shown for the sake of space limitation, other non-target and/or target wireless tag(s) TG can enter the communication area CA in some cases. Moreover, FIGS. 13 and 14 each show an ideal case where the counter values are not the same. In reality, the plurality of wireless tags TG has the same counter value and the wireless tag communication apparatus 1 cannot receive the identification information (tag ID) in some cases.

As shown in FIG. 13, for example, in a slot 1 (SLT #1) of a first round in the first processing process (PRO1), the wireless tag communication apparatus 1 specifies the A value as the flag state and sends a query to the wireless tag TG that has entered the communication area CA (Step S1).

In response to the query sent from the wireless tag communication apparatus 1, for example, the non-target wireless tag a transmits the identification information (tag ID) to the wireless tag communication apparatus 1 (Step S2).

Then, on the basis of the contents stored in the detection target storage unit 21, the wireless tag communication apparatus 1 determines whether or not the identification information is an acquisition target of data for location detection (Step S3). The wireless tag communication apparatus 1 determines that the non-target wireless tag a with the received identification information is not the data acquisition target. Next, the wireless tag communication apparatus 1 issues an instruction not to change a flag to the wireless tag a determined not to be the data acquisition target (Step S5) and terminates the processing of this slot.

In the next slot 2 (SLT #2), the wireless tag communication apparatus 1 specifies the A value as the flag state and sends a query to the wireless tag TG that has entered the communication area CA (Step S1). It should be noted that the non-target wireless tag a has received the instruction not to change the flag, and therefore the non-target wireless tag a maintains the A value as the flag state even when receiving this query.

For example, the target wireless tag b of the remaining target wireless tags TG excluding the non-target wireless tag a that has already transmitted the identification information transmits the identification information (tag ID) to the wireless tag communication apparatus 1 in response to the query (Step S2).

When the wireless tag communication apparatus 1 receives the identification information transmitted from the target wireless tag b, the wireless tag communication apparatus 1 determines whether or not the identification information is an acquisition target of data for location detection, i.e., a reading target in the second processing process on the basis of contents stored in the detection target storage unit 21 and the location correction enable flag storage unit 22 (Step S3). The wireless tag communication apparatus 1 determines that the target wireless tag b with the received identification information is the data acquisition target. The wireless tag communication apparatus 1 determines that the target wireless tag b is the data acquisition target, and therefore the wireless tag communication apparatus 1 does not issue the instruction not to change the flag here. When this determination ends, the wireless tag communication apparatus 1 terminates the processing in this slot.

In the next slot 3 (SLT #3), the wireless tag communication apparatus 1 specifies the A value as the flag state and sends a query to the wireless tag TG that has entered the communication area CA (Step S1).

The target wireless tag b that has received this query has not received the instruction not to change the flag, and therefore the target wireless tag b rewrites the flag state from the A value to the B value (Step S4).

Moreover, any one of the remaining target wireless tags TG excluding the target wireless tag TG that has already transmitted the identification information transmits the identification information (tag ID) to the wireless tag communication apparatus 1 in response to the query (Step S2). When the wireless tag communication apparatus 1 receives the identification information, the wireless tag communication apparatus 1 determines whether or not the identification information is an acquisition target of data for location detection, i.e., a reading target in the second processing process on the basis of contents stored in the detection target storage unit 21 and the location correction enable flag storage unit 22 (Step S3).

Thereafter, the respective wireless tags TG and the wireless tag communication apparatus 1 similarly perform the processing for the remaining slot(s) of this round, and further the subsequent round(s). This first processing process is performed until a predetermined period of time elapses or a predetermined number of rounds are processed. The predetermined number of rounds may be one round.

As shown in FIG. 14, the wireless tag communication apparatus 1 specifies the B value as the flag state and sends a query to the wireless tag TG that has entered the communication area CA, for example, in the slot 1 (SLT #1) of the n-th round of the second processing process (PRO2) (Step S6).

The non-target wireless tag a whose flag state maintains the A value does not respond to this query specifying the B value as the flag state. That is, the non-target wireless tag a ignores this query. Therefore, for example, the target wireless tag b of the remaining two target wireless tags TG whose flag states have been rewritten to the B value in the first processing process transmits the identification information (tag ID) to the wireless tag communication apparatus 1 in response to the query (Step S2).

When the wireless tag communication apparatus 1 receives the identification information transmitted from the target wireless tag b, the wireless tag communication apparatus 1 acquires data for location detection, i.e., a time of acquisition, an RSSI, and a phase (Step S7), and determines whether or not the received identification information corresponds to an acquisition target of data for location detection, i.e., a reading target on the basis of contents stored in the detection target storage unit 21 and the location correction enable flag storage unit 22 (Step S3). The wireless tag communication apparatus 1 determines that the target wireless tag b with the received identification information is the data acquisition target.

The wireless tag communication apparatus 1 sends the received identification information of the target wireless tag b and the acquired data for location detection to the upper-level equipment UE (Step S21). The upper-level equipment UE receives such data and stores the data for location detection in the read data storage unit 1021 in association with the identification information. It should be noted that the wireless tag communication apparatus 1 does not need to calculate the apparatus location and may send a detection result of the sensor 50 acquired in Step S7 to the upper-level equipment UE for calculating the apparatus location at the upper-level equipment UE. In each slot of each round up to the n-th round, similarly, the wireless tag communication apparatus 1 acquires the identification information of the location detection target wireless tag TG and the data for location detection and sends the identification information of the location detection target wireless tag TG and the data for location detection to the upper-level equipment UE to thereby store the data for location detection in the read data storage unit 1021 in association with the identification information at the upper-level equipment UE.

Then, the upper-level equipment UE determines whether or not it is possible to calculate the location of the target wireless tag TG with the received identification information on the basis of the data stored in the read data storage unit 1021 (Step S22). This operation in Step S22 corresponds to Step S8 in the first embodiment. When the determination as to whether or not it is possible to calculate the location has been completed, the upper-level equipment UE sends the notification as to whether or not it is possible to calculate the location to the wireless tag communication apparatus 1 (Step S23).

In a case where it is possible to calculate the location of the target wireless tag b with the received identification information on the basis of the data stored in the read data storage unit 1021, the upper-level equipment UE calculates the location of the target wireless tag a on the basis of the data stored in the read data storage unit 1021 for location detection (Step S24). The upper-level equipment UE stores the location of the calculated target wireless tag b in the location calculation result storage unit 1022. This operation in Step S24 corresponds to Step S9 in the first embodiment.

Moreover, in a case where it is impossible to calculate the location of the target wireless tag b with the received identification information on the basis of the data stored in the read data storage unit 1021, the upper-level equipment UE waits for the next identification information and the data for location detection to be sent from the wireless tag communication apparatus 1.

The wireless tag communication apparatus 1 receives the notification as to whether or not it is possible to calculate the location, and in a case where it is possible to calculate the location, the wireless tag communication apparatus 1 sets detection completion to the detection completion information associated with the identification information of the target wireless tag b that is the corresponding wireless tag TG in the detection target storage unit 21 (Step S10). Then, the wireless tag communication apparatus 1 terminates the processing in this slot. In contrast, in a case where it is impossible to calculate the location, the wireless tag communication apparatus 1 issues an instruction not to change the flag to the target wireless tag b (not shown) and terminates the processing of this slot.

In the next slot 2 (SLT #2), the wireless tag communication apparatus 1 specifies the B value as the flag state and sends a query to the wireless tag TG that has entered the communication area CA (Step S6).

The target wireless tag b that has received the query without receiving the instruction not to change the flag rewrites the flag state from the B value to the A value (Step S25).

Moreover, in response to the query, any one wireless tag TG (not shown), e.g., the non-target wireless tag TG, transmits the identification information (tag ID) to the wireless tag communication apparatus 1 (Step S2). Then, the wireless tag communication apparatus 1 acquires the data for location detection (Step S7). Then, the wireless tag communication apparatus 1 determines whether or not the non-target wireless tag TG is an acquisition target of data for location detection on the basis of the identification information (Step S3). In a case where the non-target wireless tag TG is not the data acquisition target, the wireless tag communication apparatus 1 terminates the processing in this slot.

In the next slot 3 (SLT #3), the wireless tag communication apparatus 1 sends a query specifying the B value as the flag state (Step S6). The target wireless tag b whose flag state has been rewritten from the B value to the A value does not respond to this query specifying the B value as the flag state. That is, the target wireless tag b ignores this query. Therefore, any one target or non-target wireless tag TG of the remaining target wireless tags TG transmits the identification information (tag ID) to the wireless tag communication apparatus 1 in response to the query (Step S2).

Thereafter, the respective wireless tags TG and the wireless tag communication apparatus 1 similarly perform the processing for the remaining slot(s) of this round, and further the subsequent round(s). This second processing process is performed until a predetermined period of time elapses or a predetermined number of rounds are processed.

Figure 15:
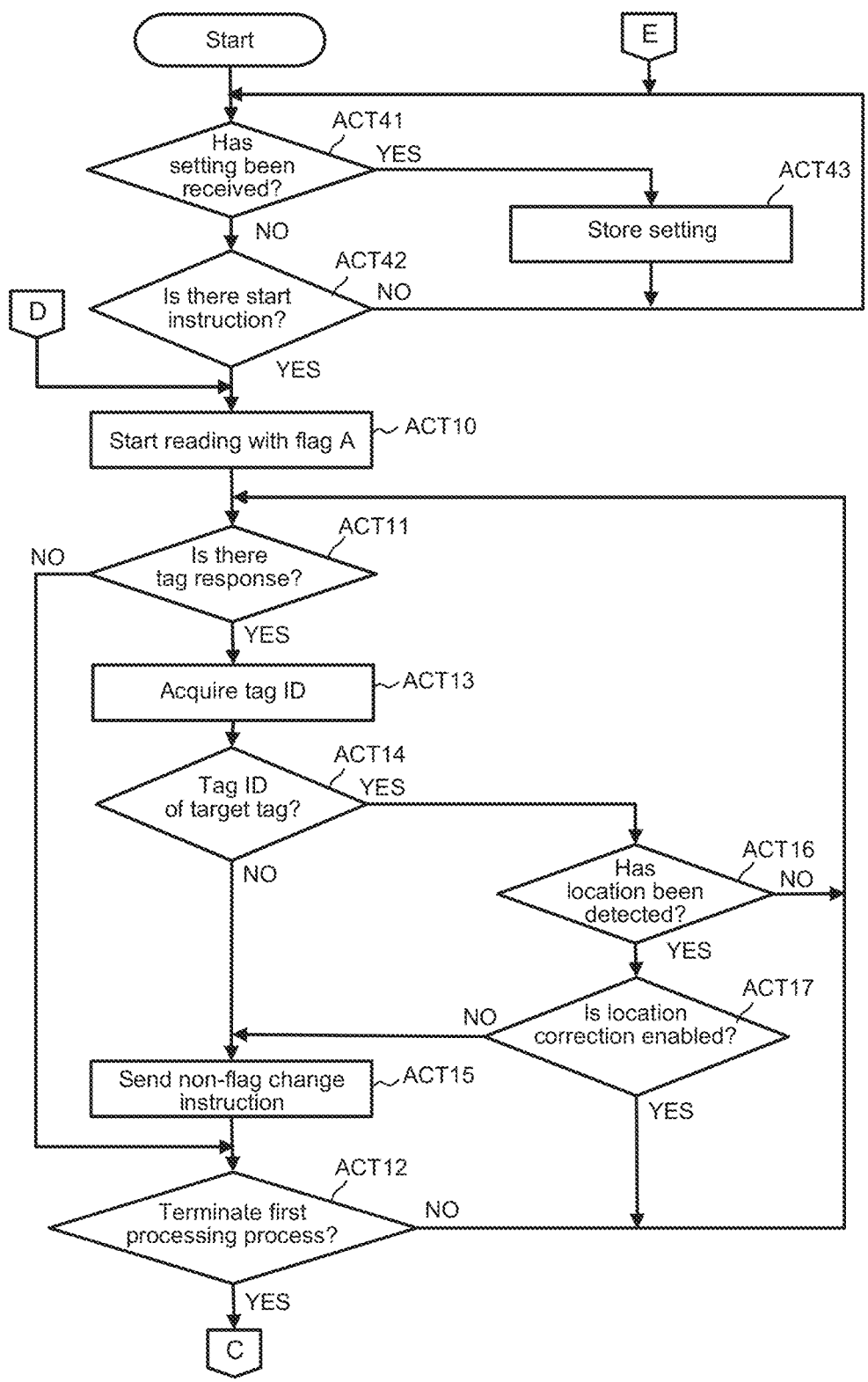
FIG. 15 is a diagram showing a first part of a flow diagram showing a main-part procedure of information processing executed by a processor of the wireless tag communication apparatus according to the second embodiment.
Figure 16:
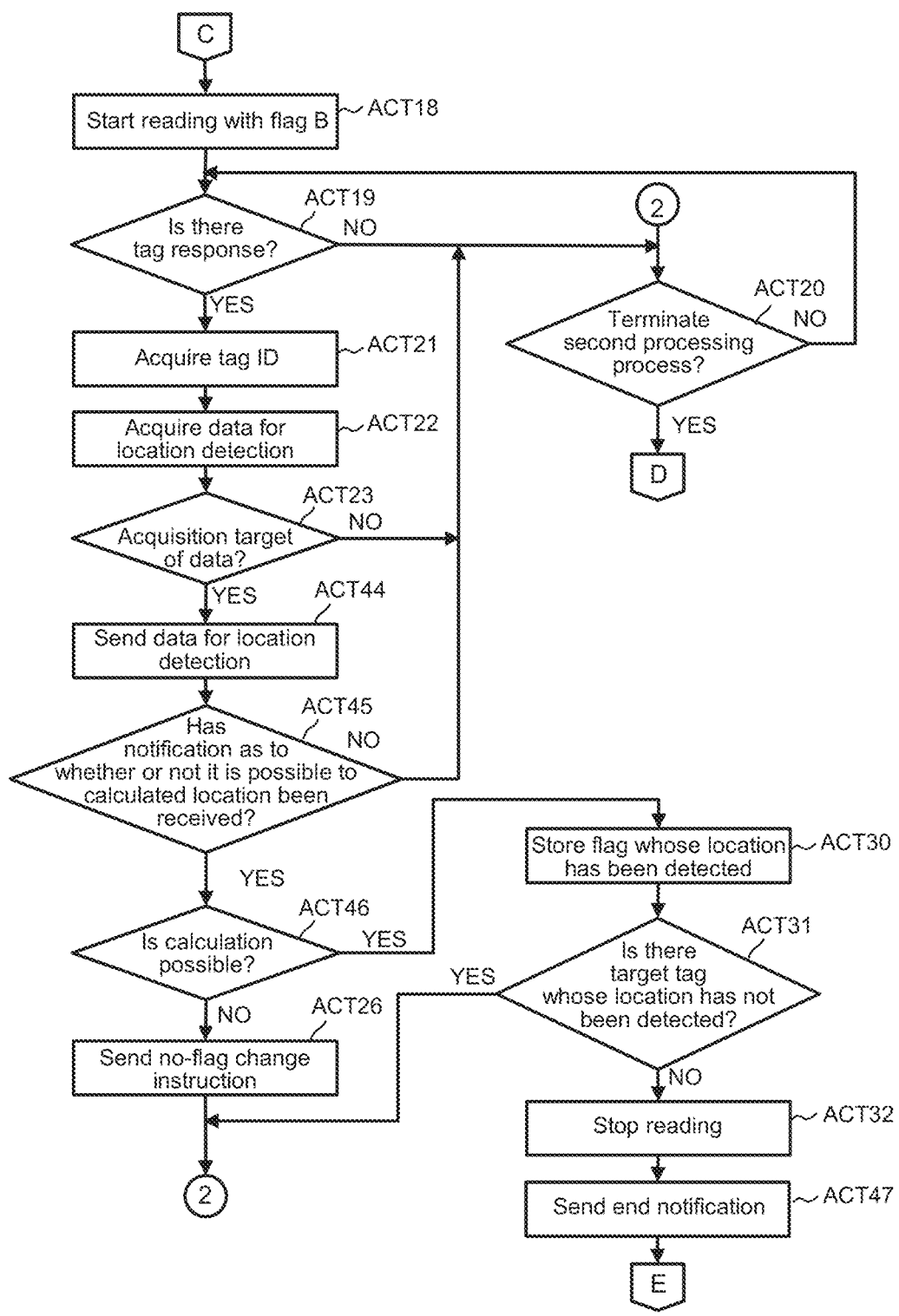
FIG. 16 is a diagram showing a second part of the flow diagram showing the main-part procedure of the information processing executed by the processor of the wireless tag communication apparatus according to the second embodiment.
Figure 17:
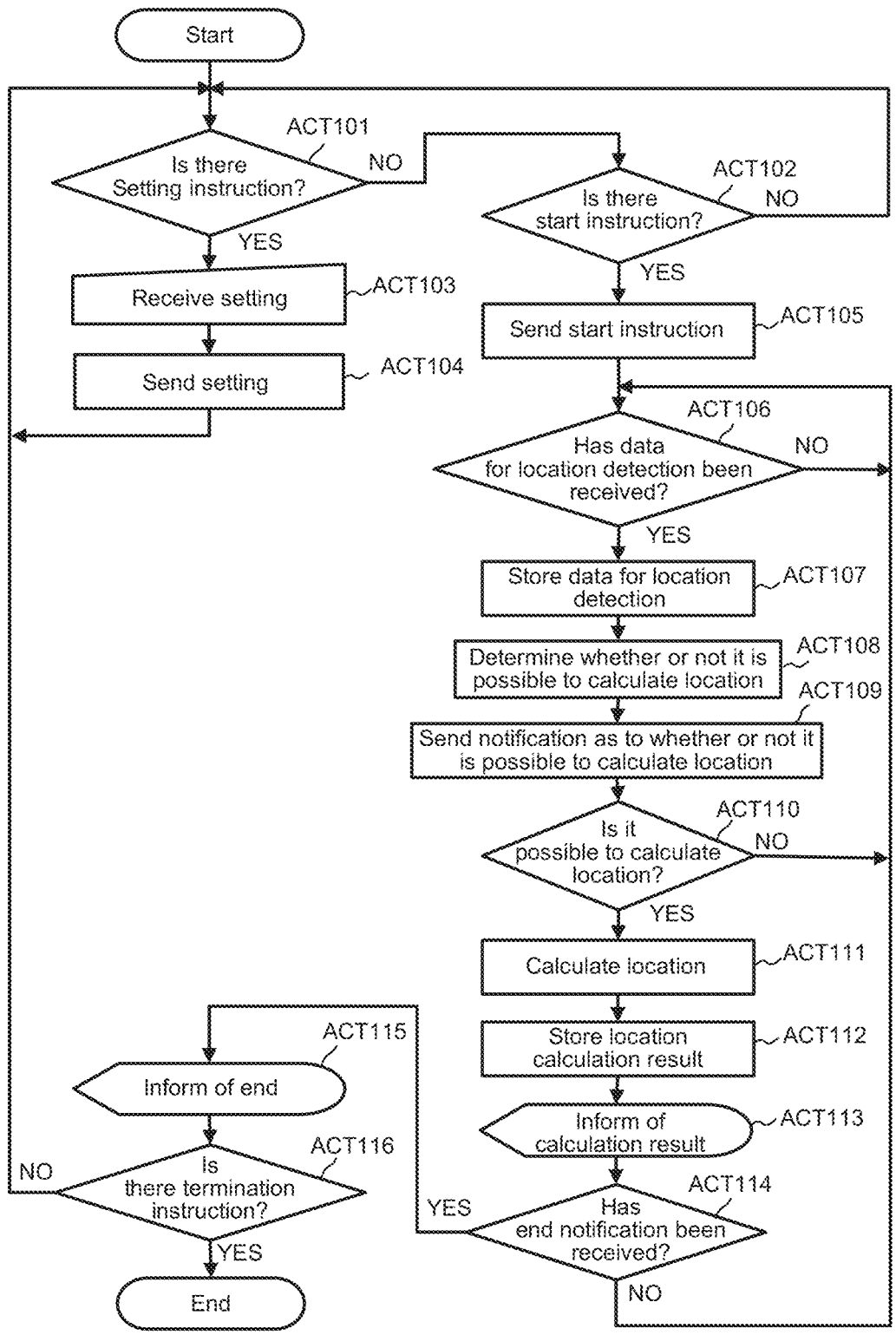
FIG. 17 is a flow diagram showing a main-part procedure of information processing executed by a processor of upper-level equipment in the wireless tag communication system.

Next, a specific example of the operation of the wireless tag communication apparatus 1 and the upper-level equipment UE will be described. FIGS. 15 and 16 are a series of flow diagrams showing a main-part procedure of the information processing that is performed by the processor 10 of the wireless tag communication apparatus 1. When powered on, the processor 10 of the wireless tag communication apparatus 1 performs this processing on the basis of the control program stored in the memory 20. Moreover, FIG. 17 is a flow diagram showing a main-part procedure of the information processing that is performed by the processor 101 of the upper-level equipment UE. The processor 101 of the upper-level equipment UE performs this processing on the basis of the control program in accordance with a start operation via the input device 103 that starts the control program stored in the memory 102 as the application program, for example. It should be noted that the procedure shown in FIGS. 15, 16, and 17 is an example and the procedure is not particularly limited as long as a similar result can be obtained.

As shown in FIG. 15, the processor 10 of the wireless tag communication apparatus 1 determines whether or not the processor 10 has received a setting from the upper-level equipment UE via the communication interface 70 as ACT41. In a case where the processor 10 has received the setting from the upper-level equipment UE, the processor 10 determines YES in ACT41 and shifts to ACT43. Moreover, in a case where the processor 10 has not received the setting from the upper-level equipment UE, the processor 10 determines NO in ACT41 and shifts to ACT42.

As ACT42, the processor 10 determines whether or not the processor 10 has received a start instruction to start the location detection of the location detection target wireless tag TG from the upper-level equipment UE via the communication interface 70. In a case where the processor 10 has received the start instruction from the upper-level equipment UE, the processor 10 determines YES in ACT42 and shifts to ACT10. Moreover, in a case where the processor 10 has not received the start instruction from the upper-level equipment UE, the processor 10 determines NO in ACT42 and shifts to ACT41.

As shown in FIG. 17, as ACT101, the processor 101 of the upper-level equipment UE determines whether or not there is a setting instruction by an operation on the input device 103 from the user. In a case where there is a setting instruction, the processor 101 determines YES in ACT101 and shifts to ACT103. In a case where there is no setting instruction, the processor 101 determines NO in ACT101 and shifts to ACT102.

As ACT102, the processor 101 determines whether or not there is a location detection start instruction of the location detection target wireless tag TG by an operation on the input device 103 from the user. In a case where there is a location detection start instruction, the processor 101 determines YES in ACT102 and shifts to ACT105. In a case where there is no location detection start instruction, the processor 101 determines NO in ACT102 and shifts to ACT101.

As ACT103, the processor 101 receives a setting by the operation on the input device 103 from the user. The setting contents are specifying the target wireless tag TG that performs the location detection and specifying whether the location correction is enabled/disabled. Specifying the location detection target wireless tag TG may be directly inputting the identification information or may take any form, e.g., displaying a list of wireless tags TG that can be specified on a display device that is the output device 104 and selecting any one from the list.

As ACT104, the processor 101 transmits the received setting contents to the wireless tag communication apparatus 1 via the communication interface 105. Then, the processor 101 shifts to ACT101.

As shown in FIG. 15, as ACT43, the processor 10 of the wireless tag communication apparatus 1 stores the setting contents sent from the upper-level equipment UE in the detection target storage unit 21 and the location correction enable flag storage unit 22. Then, the processor 10 shifts to ACT41.

As shown in FIG. 17, as ACT105, the processor 101 of the upper-level equipment UE sends the start instruction to the wireless tag communication apparatus 1 via the communication interface 105.

As ACT106, the processor 101 determines whether or not the processor 101 has received the data for location detection sent from the wireless tag communication apparatus 1 via the communication interface 105. In a case where the processor 101 has received the data for location detection, the processor 101 determines YES in ACT106 and shifts to ACT107. In a case where the processor 101 has not received the data for location detection, the processor 101 determines NO in ACT106 and repeats this ACT106 again. In this manner, the processor 101 waits to receive the data for location detection.

As shown in FIG. 15, as ACT10, as described above in the first embodiment, the processor 10 of the wireless tag communication apparatus 1 starts reading of the wireless tag TG, specifying the A value as the flag state.

As ACT11, as described above in the first embodiment, the processor 10 determines whether or not there is a response from any one wireless tag TG. In a case where there is a response, the processor 10 determines YES in ACT11 and shifts to ACT13. Moreover, in a case where there is no response, the processor 10 determines NO in ACT11 and shifts to ACT12.

As ACT12, as described above in the first embodiment, the processor 10 determines whether or not to terminate the first processing process. Not to terminate the first processing process, the processor 10 determines NO in ACT12 and shifts to ACT11. To terminate the first processing process, the processor 10 determines YES in ACT12 and shifts to ACT18.

As ACT13, as described above in the first embodiment, the processor 10 acquires the tag ID of the wireless tag TG that has transmitted the response, i.e., the identification information and stores the tag ID received by the wireless communication device 60 in the work area of the memory 20.

As ACT14, as described above in the first embodiment, the processor 10 determines whether or not the received tag ID is the tag ID of the location detection target wireless tag TG. In a case where the received tag ID is the tag ID of the location detection target wireless tag TG, the processor 10 determines YES in ACT14 and shifts to ACT16. Moreover, in a case where the received tag ID is not the tag ID of the location detection target wireless tag TG, the processor 10 determines NO in ACT14 and shifts to ACT15.

As ACT15, as described above in the first embodiment, the processor 10 issues an instruction not to change the flag to the non-location detection target wireless tag TG that has transmitted a response via the wireless communication device 60 and then, shifts to ACT12.

As ACT16, as described above in the first embodiment, the processor 10 determines whether or not the location of the wireless tag TG determined as being the location detection target has been detected. In a case where the location has been detected, the processor 10 determines YES in ACT16 and shifts to ACT17. In a case where the location has not been detected, the processor 10 determines NO in ACT16 and shifts to ACT16.

As ACT17, as described above in the first embodiment, the processor 10 determines whether or not the location correction is enabled by checking the location correction enable flag indicating whether or not it is necessary to correct the detected location of the wireless tag TG, the location correction enable flag having been stored which has been stored in the location correction enable flag storage unit 22. Unless the location correction is enabled, the processor 10 determines NO in ACT17 and shifts to ACT15 to thereby issue an instruction not to change the flag to the wireless tag TG that has transmitted the response. In a case where the location correction is enabled, the processor 10 determines YES in ACT17 and shifts to ACT11. Accordingly, no instruction not to change the flag is issued to the wireless tag TG that has transmitted the response, and it is possible to cause the flag state of the wireless tag TG to be rewritten from the A value to the B value in response to the query in the next slot. Therefore, even the wireless tag TG whose location has been detected can be set as a reading target.

As shown in FIG. 16, as ACT18, as described above in the first embodiment, the processor 10 causes the wireless communication device 60 to operate and starts reading of the wireless tag TG, specifying the B value as the flag state.

As ACT19, as described above in the first embodiment, the processor 10 determines whether or not there is a response from any one wireless tag TG. In a case where there is no response, the processor 10 determines NO in ACT19 and shifts to ACT20. Moreover, in a case where there is a response, the processor 10 determines YES in ACT19 and shifts to ACT21.

As ACT20, as described above in the first embodiment, the processor 10 determines whether or not to terminate the second processing process. Not to terminate the second processing process, the processor 10 determines NO in ACT20 and shifts to ACT19. To terminate the second processing process, the processor 10 determines YES in ACT20 and shifts to ACT10.

As ACT21, as described above in the first embodiment, the processor 10 acquires the tag ID of the wireless tag TG that has transmitted the response and stores the tag ID received by the wireless communication device 60, i.e., the identification information in the work area of the memory 20.

As ACT22, as described above in the first embodiment, the processor 10 acquires the data for location detection. Specifically, the processor 10 acquires a time and detects an RSSI and a phase via the RSSI detector 63 and the phase detector 64 of the wireless communication device 60. Moreover, on the basis of a detection result of the sensor 50, the processor 10 calculates location and orientation of the wireless tag communication apparatus 1, more particularly, the antenna 61. Alternatively, the processor 10 does not need to calculate location and orientation of the antenna 61.

As ACT23, as described above in the first embodiment, the processor 10 determines whether or not the wireless tag TG is an acquisition target of data for location detection on the basis of the tag ID, i.e., the identification information stored in the work area. In a case where the wireless tag TG is not an acquisition target of data for location detection, the processor 10 determines NO in ACT23 and shifts to ACT20. At this time, the tag ID, i.e., the identification information stored in the work area and the data for location detection are cleared, i.e., deleted. In a case where the wireless tag TG is an acquisition target of data for location detection, the processor 10 determines YES in ACT23 and shifts to ACT44.

As ACT44, the processor 10 sends the acquired data for location detection to the upper-level equipment UE together with the tag ID, i.e., the identification information stored in the work area via the communication interface 70. It should be noted that the data for location detection includes location and orientation of the antenna 61 in a case where the location and orientation of the antenna 61 have been calculated in ACT22 or a detection result of the sensor 50 in a case where the location and orientation of the antenna 61 have not been calculated in ACT22. Then, the processor 10 shifts to ACT45. In this manner, the communication interface 70 is an example of an interface apparatus that sends the RSSI and/or the phase that is a communication state detected by the RSSI detector 63 and/or the phase detector 64 as a state detector that detects the communication state with the wireless tag TG by the wireless communication device 60, to the upper-level equipment UE that is a detection apparatus that detects a location of the wireless tag TG on the basis of this communication state.

As shown in FIG. 17, as ACT107, the processor 101 of the upper-level equipment UE stores the received data for location detection in the read data storage unit 1021 in association with the received tag ID, i.e., the identification information. The operation in ACT107 corresponds to ACT23 in the first embodiment.

As ACT108, the processor 101 determines whether or not it is possible to detect the location of the wireless tag TG on the basis of the data for location detection stored in the read data storage unit 1021.

As ACT109, the processor 101 sends a notification as to whether or not it is possible to calculate the location, which is a result of determination, to the wireless tag communication apparatus 1 via the communication interface 105.

As ACT110, the processor 101 determines whether or not it is possible to calculate the location as the result of determination in ACT108. In a case where it is possible to calculate the location, the processor 101 determines YES in ACT110 and shifts to ACT111. In a case where it is impossible to calculate the location, the processor 101 determines NO in ACT110 and shifts to ACT106. The operation in ACT110 corresponds to ACT25 in the first embodiment.

As ACT111, the processor 101 calculates a location of the wireless tag TG on the basis of the data for location detection stored in the read data storage unit 1021. The operation in ACT111 corresponds to ACT27 in the first embodiment.

As ACT112, the processor 101 stores the calculated location in the location calculation result storage unit 1022 in association with the identification information of the wireless tag TG. The operation in ACT112 corresponds to ACT28 in the first embodiment.

As ACT113, the processor 101 informs of the calculation result via the output device 104. The operation in ACT113 corresponds to ACT29 in the first embodiment.

As ACT114, the processor 101 determines whether or not the processor 101 has received an end notification from the wireless tag communication apparatus 1 via the communication interface 105. In a case where the processor 101 has received the end notification, the processor 101 determines YES in ACT114 and shifts to ACT115. In a case where the processor 101 has not received the end notification, the processor 101 determines NO in ACT114 and shifts to ACT106.

As shown in FIG. 16, as ACT45, the processor 10 of the wireless tag communication apparatus 1 determines whether or not the processor 10 has received the notification as to whether or not it is possible to calculate the location from the upper-level equipment UE via the communication interface 70. In a case where the processor 10 has received the notification as to whether or not it is possible to calculate the location, the processor 10 determines YES in ACT45 and shifts to ACT46. In a case where the processor 10 has not received the notification as to whether or not it is possible to calculate the location, the processor 10 determines NO in ACT45 and shifts to ACT20. In this manner, the communication interface 70 is an example of the interface apparatus that receives a location detection completion notification indicating the wireless tag TG whose location has been detected from the upper-level equipment UE.

As ACT46, the processor 10 determines whether or not it is possible to calculate the location as a result of the determination as to whether or not it is possible to calculate the location, which is indicated by the received notification as to whether or not it is possible to calculate the location. In a case where it is possible to calculate the location, the processor 10 determines YES in ACT46 and shifts to ACT30. In a case where it is impossible to calculate the location, the processor 10 determines NO in ACT46 and shifts to ACT26.

As ACT26, as described above in the first embodiment, the processor 10 sends a non-flag change instruction to the wireless tag TG that has transmitted the identification information via the wireless communication device 60. Then, the processor 10 shifts to ACT20.

As ACT30, as described above in the first embodiment, the processor 10 stores the flag whose location has been detected. Therefore, the processor 10 is an example of the storage control functional part that sets the detection completion information stored in the detection target storage unit 21 in association with the identification information of the wireless tag TG to be one indicating that the location has been detected.

As ACT31, as described above in the first embodiment, the processor 10 determines whether or not there is a target wireless tag whose location has not been detected. In a case where there is a target wireless tag whose location has not been detected, the processor 10 determines YES in ACT31 and shifts to ACT20. It should be noted that in a case where one round ends at this time, the processor 10 starts the next round. In a case where there is no target wireless tag whose location has not been detected, the processor 10 determines NO in ACT31 and shifts to ACT32.

As ACT32, as described above in the first embodiment, the processor 10 terminates the operation of the wireless communication device 60 and stops reading of the wireless tag TG in which the B value is specified as the flag state. Then, in the present embodiment, the processor 10 shifts to ACT47.

As ACT47, the processor 10 sends the end notification to the upper-level equipment UE via the communication interface 70. Then, the processor 10 shifts to ACT41.

As shown in FIG. 17, as ACT115, the processor 101 of the upper-level equipment UE that has received the end notification informs of the reading end via the output device 104.

As ACT116, the processor 101 determines whether or not there is a termination instruction by the operation on the input device 103 from the user. In a case where there is no termination instruction, the processor 101 determines NO in ACT116 and shifts to ACT101. In a case where there is a termination instruction, the processor 101 determines YES in ACT116 and terminates the processing of the control program as the application program.

Moreover, the user is able to terminate the operation of the processor 101 of the wireless tag communication apparatus 1 shown in FIGS. 15 and 16 by powering off the wireless tag communication apparatus 1.

As described above, in accordance with the wireless tag communication apparatus 1 according to the second embodiment, provided is the communication interface 70 as an interface unit that sends the RSSI and/or the phase that is a communication state detected by the RSSI detector 63 and/or the phase detector 64 as a state detector that detects the communication state with the wireless tag TG by the wireless communication device 60 when the identification information is acquired from the reading target wireless tag TG, to the upper-level equipment UE that is a detection apparatus that detects a location of the wireless tag TG on the basis of this communication state. Therefore, in accordance with the wireless tag communication apparatus 1 in the second embodiment, it is possible to cause the upper-level equipment UE to detect the location of the wireless tag TG by transmitting the communication state to the upper-level equipment UE. In particular, by causing the processing of the location detection that requires processing capability to be performed in the upper-level equipment UE that is an information processing apparatus such as an information processing device such as a server computer or a smartphone, an inexpensive one without so high processing capability can be used as the processor 10 of the wireless tag communication apparatus 1, which can reduce the cost for the wireless tag communication apparatus 1.

Moreover, in accordance with the wireless tag communication apparatus 1 according to the second embodiment, the communication interface 70 receives the detection completion notification indicating the wireless tag TG whose location has been detected from the upper-level equipment UE and the processor 101 sets, on the basis of the detection completion notification received by the communication interface 70, the detection completion information stored in the detection target storage unit 21 in association with the identification information of the wireless tag TG whose location has been detected to be one indicating that the location has been detected. Therefore, in accordance with the wireless tag communication apparatus 1 in the second embodiment, the contents of the detection target storage unit 21 can be updated in accordance with the location detection of the wireless tag TG in the upper-level equipment UE. Thus, it is possible to use the updated contents for determining the detected wireless tag TG in the subsequent slot or round.

Moreover, in accordance with the wireless tag communication system according to the second embodiment, on the basis of the RSSI and/or the phase that is a communication state with the wireless tag TG, a portion that detects the location of the wireless tag TG is carried out in the upper-level equipment UE connected to the wireless tag communication apparatus 1. Also in this manner, as in the first embodiment, in the wireless tag communication apparatus 1, first of all, the processor 10 acquires the identification information from the wireless tag TG in accordance with the identification information reading command specifying the A value and rewrites the flag state to the B value only with respect to the detection target wireless tag TG whose location has not been detected yet to thereby reduce the reading target wireless tags TG, and then repeats acquisition of the identification information from the wireless tag TG in accordance with the identification information reading command specifying the B value. Therefore, the wireless tag TG whose location has been detected and the non-location detection target wireless tag TG can be prevented from responding to the identification information reading command specifying, for example, the A value that is the first state in the subsequent slot or round. Therefore, since the wireless tag TG whose location has been detected and the non-location detection target wireless tag TG do not deprive the opportunity to read the wireless tag TG whose location has not been detected, it is possible to reduce the time to read all wireless tags that are a plurality of location detection targets. Moreover, in particular, the processing of the location detection that requires processing capability is performed in the upper-level equipment UE that is an information processing apparatus such as an information processing device such as a server computer or a smartphone. Therefore, an inexpensive one without so high processing capability can be used as the processor 10 of the wireless tag communication apparatus 1, which can reduce the cost for the wireless tag communication apparatus 1.

As described above, the embodiments of the wireless tag communication system and the wireless tag communication apparatus have been described, though such embodiments are not limited thereto. For example, in the first and second embodiments, in the first processing process, reading is performed on all the wireless tags TG with the A value as the flag state, i.e., all the non-location detection target wireless tag TG, the wireless tag TG whose location has been detected, and the target wireless tag TG whose location has not been detected yet, and the flag state of the wireless tag TG, which is set as a reading target in the second processing process, is rewritten to the B value. However, only target wireless tags TG whose locations have not been detected, whose identification information has been stored in the detection target storage unit 21, may be specified and read and the flag state of the wireless tag TG, which is set as a reading target in the second processing process, may be rewritten to the B value.

Moreover, ACT28 and ACT30 in the flow diagram in FIG. 11 may be reversed or may be performed in parallel. In this manner, as long as there is no conflict with the preceding or following processes, the order of the processes may be changed, or multiple processes may be performed in parallel.

Moreover, in the second embodiment, the wireless tag communication apparatus 1 issues the instruction not to change the flag in a case where it is impossible to calculate the location after the wireless tag communication apparatus 1 receives the notification as to whether or not it is possible to calculate the location, which is sent from the upper-level equipment UE. However, the wireless tag communication apparatus 1 may send the instruction not to change the flag to the wireless tag in a phase in which the wireless tag TG has been determined as a target wireless tag in the data acquisition target determination. In this case, in a case where NO is determined in ACT23, it is sufficient to shift to ACT26 rather than shifting to ACT20. Accordingly, also in a case where the communication with the upper-level equipment UE or the determination of the upper-level equipment UE as to whether or not it is possible to calculate the location takes long time, it is possible to reliably send the instruction not to change the flag to the wireless tag TG.

It should be noted that in the above-mentioned embodiments, the control program executed by the processor 10 of the wireless tag communication apparatus 1 or the processor 101 of the upper-level equipment UE may be configured to be provided, recorded on a non-transitory computer-readable recording medium such as a CD-ROM. Moreover, the control program may be configured to be stored on a computer connected to a network such as the Internet and provided by being downloaded via the network.

Moreover, the respective functions of the above-mentioned embodiments can be realized by one or more processing circuits. Here, the "processing circuits" in this specification include a processor programmed to perform the respective functions in accordance with software like a processor implemented by an electronic circuit and devices such as an application specific integrated circuit (ASIC), a digital signal processor (DSP), a field programmable gate array (FPGA), and a conventional circuit module which are designed to perform the respective functions described above.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless tag communication apparatus, comprising:
a wireless communication device that sends a reading command for reading identification information of a wireless tag to the wireless tag and receives the identification information from the wireless tag, the reading command specifying a flag state, which is either one of a first state and a second state, which is stored in a flag of the wireless tag, the wireless tag transmitting the identification information only in a case where the flag state corresponds to the specified flag state when the wireless tag receives the reading command specifying the flag state; and
a processor configured to
send the reading command specifying the first state as the flag state via the wireless communication device to thereby acquire the identification information transmitted from the wireless tag whose flag state is the first state and, in a case where the processor determines a wireless tag that is a detection target whose location has not been detected as a wireless tag that is a reading target on a basis of the acquired identification information, perform first processing of causing the flag state of the determined wireless tag to be rewritten from the first state to the second state, and
send the reading command specifying the second state as the flag state via the wireless communication device to thereby perform second processing of acquiring the identification information only from the wireless tag that is the reading target in the second state.

2. The wireless tag communication apparatus according to claim 1, further comprising
a memory including a detection target storage unit that stores detection completion information indicating whether or not a location of the wireless tag has been detected in association with identification information of each of one or more wireless tags that are location detection targets, wherein
the processor determines, on a basis of the acquired identification information and storage contents of the detection target storage unit of the memory, whether or not the wireless tag with the acquired identification information is the wireless tag that is the detection target whose location has not been detected.

3. The wireless tag communication apparatus according to claim 2, wherein
the memory further includes a setting storage unit that stores a setting as to whether or not to correct the location of the wireless tag whose location has been detected, and
the processor further determines, in a case where the setting stored in the setting storage unit is a setting to correct the location, the wireless tag with the identification information associated with the detection completion information stored in the detection target storage unit, as the wireless tag that is the reading target.

4. The wireless tag communication apparatus according to claim 2, wherein
the processor sets, in a case where the processor has detected the location of the wireless tag, the detection completion information stored in the detection target storage unit of the memory in association with the identification information of the wireless tag to be one indicating that the location has been detected.

5. The wireless tag communication apparatus according to claim 2, further comprising:
a state detector that detects a communication state with the wireless tag via the wireless communication device when the identification information is acquired from the wireless tag that is the reading target in the second state in the second processing; and
a communication interface that sends the detected communication state to a detection apparatus that detects a location of the wireless tag on a basis of the communication state with the wireless tag via the wireless communication device.

6. The wireless tag communication apparatus according to claim 5, wherein
the communication interface receives a detection completion notification indicating the wireless tag whose location has been detected from the detection apparatus, and
the processor sets, on a basis of the detection completion notification received by the communication interface, the detection completion information stored in the detection target storage unit of the memory in association with the identification information of the wireless tag whose location has been detected to be one indicating that the location has been detected.

7. The wireless tag communication apparatus according to claim 1, further comprising
a state detector that detects a communication state with the wireless tag via the wireless communication device, wherein
the processor detects a location of the wireless tag that is the reading target on a basis of the communication state detected by the state detector when the processor acquires the identification information from the wireless tag that is the reading target in the second state in the second processing.

8. The wireless tag communication apparatus according to claim 1, wherein
the processor performs the first processing again after a predetermined period of time elapses or after the processor performs processing of acquiring the identification information only from the wireless tag that is the reading target in the second state in the second processing a predetermined number of times after the processor causes the flag state of the wireless tag to be rewritten from the first state to the second state.

9. A wireless tag communication system including a wireless tag communication apparatus that communicates with a wireless tag and upper-level equipment that is connected to the wireless tag communication apparatus and controls the wireless tag communication apparatus, comprising:
a wireless communication device that sends a reading command for reading identification information of a wireless tag to the wireless tag and receives the identification information from the wireless tag, the reading command specifying a flag state, which is either one of a first state and a second state, which is stored in a flag of the wireless tag, the wireless tag transmitting the identification information only in a case where the flag state corresponds to the specified flag state when the wireless tag receives the reading command specifying the flag state;
a state detector that detects a communication state with the wireless tag via the wireless communication device; and
a processor configured to
send the reading command specifying the first state as the flag state via the wireless communication device to thereby acquire the identification information transmitted from the wireless tag whose flag state is the first state and, in a case where the processor determines a wireless tag that is a detection target whose location has not been detected as a wireless tag that is a reading target on a basis of the acquired identification information, perform first processing of causing the flag state of the determined wireless tag to be rewritten from the first state to the second state,
send the reading command specifying the second state as the flag state via the wireless communication device to thereby perform second processing of acquiring the identification information only from the wireless tag that is the reading target in the second state, and
detect a location of the wireless tag that is the detection target whose location has not been detected on a basis of the communication state detected by the state detector when the processor acquires the identification information from the wireless tag that is the detection target whose location has not been detected in the second processing.

10. The wireless tag communication system according to claim 9, wherein
the wireless tag communication apparatus includes the wireless communication device, the state detector, and the processor and further includes a memory having a detection target storage unit that stores detection completion information indicating whether or not the wireless tag is a wireless tag whose location has been detected in association with the identification information of each of the one or more wireless tags that are the detection targets, and
the detection target storage unit further stores identification information of a wireless tag that is the location detection target set from the upper-level equipment.

11. The wireless tag communication system according to claim 9, wherein the wireless tag communication apparatus includes the wireless communication device, the state detector, and the processor, and the upper-level equipment detects a location of the wireless tag that is the detection target whose location has not been detected on a basis of the communication state detected by the state detector when the processor acquires the identification information from the wireless tag that is the detection target whose location has not been detected in the second processing of the processor.

12. A communication method for a wireless tag communication apparatus, comprising:

sending a reading command for reading identification information of a wireless tag to the wireless tag via a wireless communication device, the reading command specifying a flag state, which is either one of a first state and a second state, which is stored in a flag of the wireless tag, the wireless tag transmitting the identification information only in a case where the flag state corresponds to the specified flag state when the wireless tag receives the reading command specifying the flag state;

sending the reading command specifying the first state as the flag state via the wireless communication device to thereby acquire the identification information transmitted from the wireless tag whose flag state is the first state and, in a case where the processor determines a wireless tag that is a detection target whose location has not been detected as a wireless tag that is a reading target on a basis of the acquired identification information, performing first processing of causing the flag state of the determined wireless tag to be rewritten from the first state to the second state, and sending the reading command specifying the second state as the flag state via the wireless communication device to thereby perform second processing of acquiring the identification information only from the wireless tag that is the reading target in the second state.

* * * * *